(12) United States Patent
Fujita et al.

(10) Patent No.: US 8,254,039 B2
(45) Date of Patent: Aug. 28, 2012

(54) VARIABLE MAGNIFICATION OPTICAL SYSTEM AND PROJECTOR

(75) Inventors: Kazuhiro Fujita, Tokyo (JP); Issei Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 378 days.

(21) Appl. No.: 12/546,430

(22) Filed: Aug. 24, 2009

(65) Prior Publication Data
US 2010/0053737 A1 Mar. 4, 2010

(30) Foreign Application Priority Data

Sep. 2, 2008 (JP) .................................. 2008-225269
Jun. 26, 2009 (JP) .................................. 2009-152735

(51) Int. Cl.
*G02B 17/00* (2006.01)
*G03B 21/28* (2006.01)

(52) U.S. Cl. ......................................... 359/727; 353/98
(58) Field of Classification Search .................. 359/432, 359/676, 691, 692, 726, 727; 353/98
See application file for complete search history.

(56) References Cited

U.S. PATENT DOCUMENTS

| | | | |
|---|---|---|---|
| 2006/0227432 A1* | 10/2006 | Yoshikawa et al. | 359/726 |
| 2008/0068563 A1 | 3/2008 | Abe et al. | |
| 2008/0068564 A1 | 3/2008 | Abe et al. | |
| 2008/0158439 A1 | 7/2008 | Nishikawa | |
| 2009/0015801 A1 | 1/2009 | Takaura et al. | |
| 2009/0021703 A1 | 1/2009 | Takaura et al. | |
| 2010/0097581 A1* | 4/2010 | Yamada et al. | 353/70 |
| 2010/0157421 A1* | 6/2010 | Abe et al. | 359/364 |

FOREIGN PATENT DOCUMENTS

| | | |
|---|---|---|
| JP | 2004-295107 | 10/2004 |
| JP | 2005-189768 | 7/2005 |
| JP | 2006-184591 | 7/2006 |
| JP | 2008-96983 | 4/2008 |
| JP | 2008-96984 | 4/2008 |

OTHER PUBLICATIONS

U.S. Appl. No. 12/160,818, filed Jul. 14, 2008, Abe, et al.
U.S. Appl. No. 12/508,174, filed Jul. 23, 2009, Abe, et al.

* cited by examiner

*Primary Examiner* — Alessandro Amari
(74) *Attorney, Agent, or Firm* — Oblon, Spivak, McClelland, Maier & Neustadt, L.L.P.

(57) ABSTRACT

A variable magnification optical system projects an image onto a screen with a sufficient magnification without requiring a large-sized mirror. The variable magnification optical system includes a first optical system through which a light beam modulated with an image signal corresponding to the image is passed; a second optical system disposed downstream of the first optical system in a direction of travel of the light beam along an optical axis; and a reflective optical element having a magnification power that is configured to reflect the light beam from the second optical system toward the screen. A magnification of the image projected on the screen is changed by moving the reflective optical element relative to the object plane, thus changing a distance between the screen and the reflective optical element, while an incident angle of the light beam on the screen is maintained substantially constant.

20 Claims, 30 Drawing Sheets

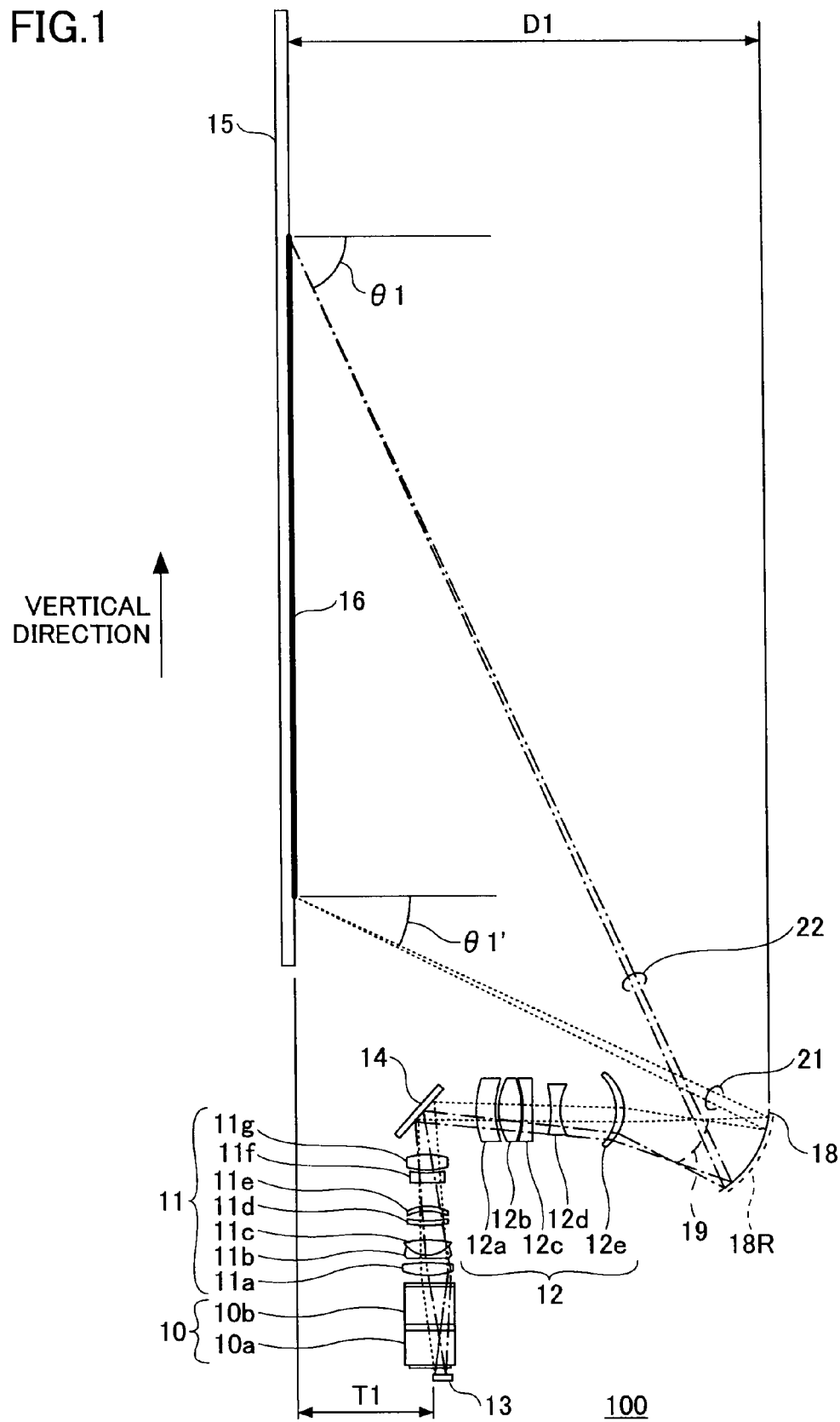

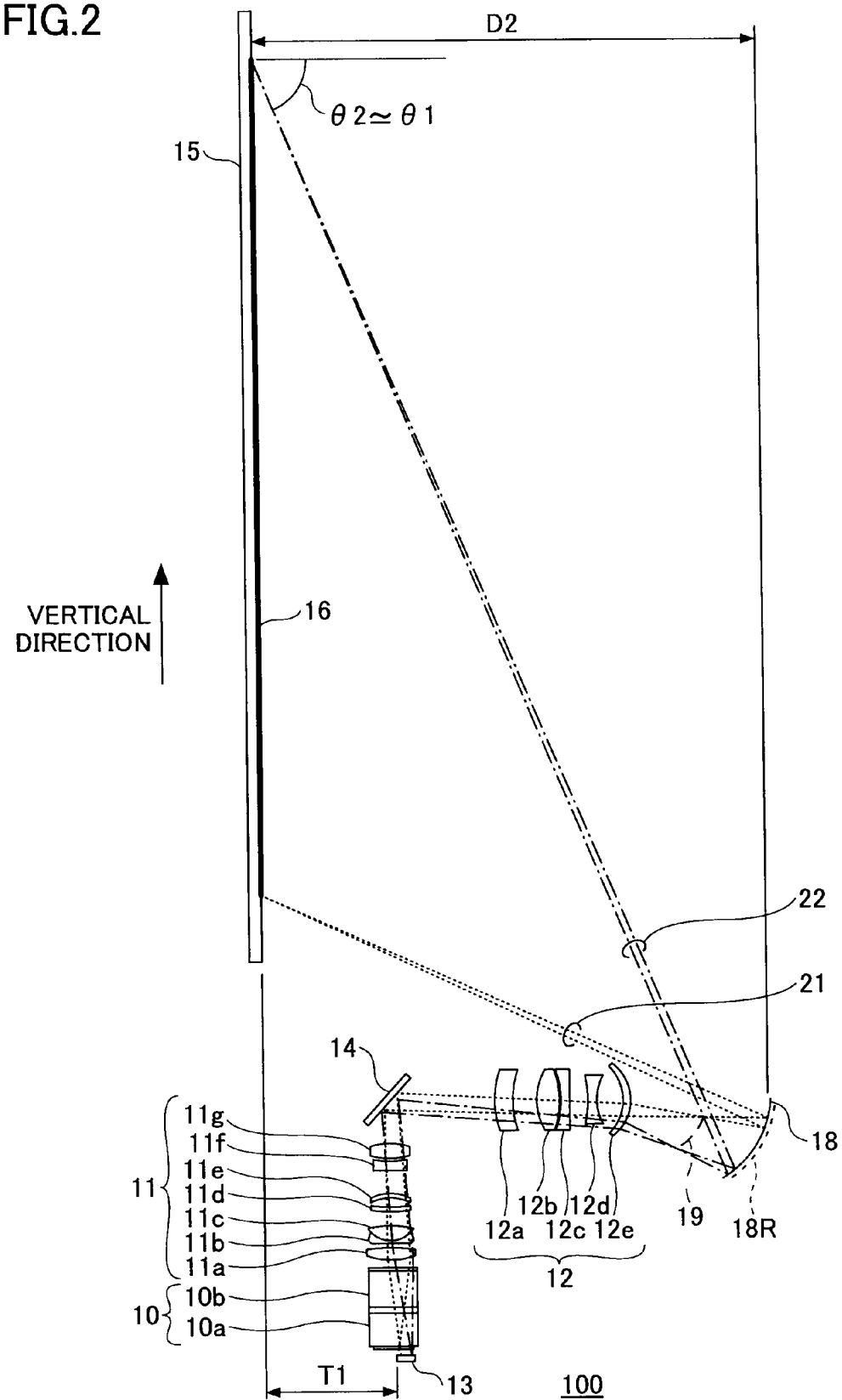

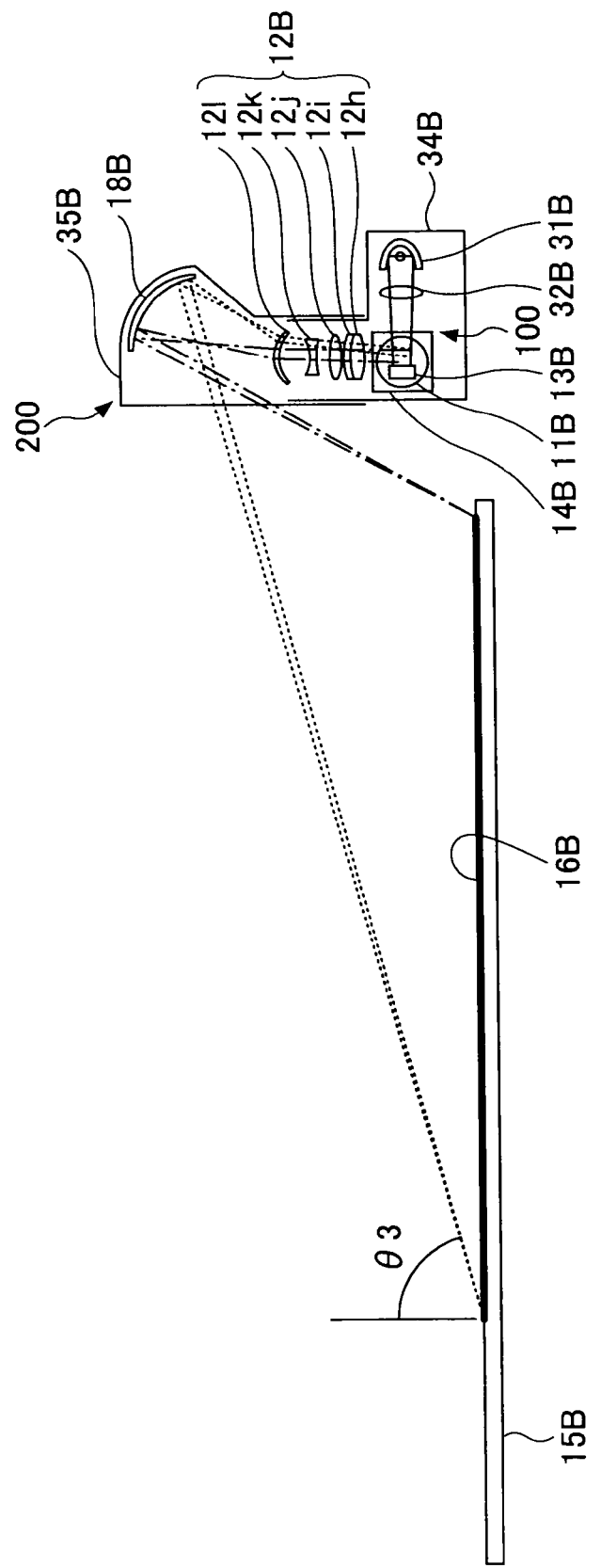

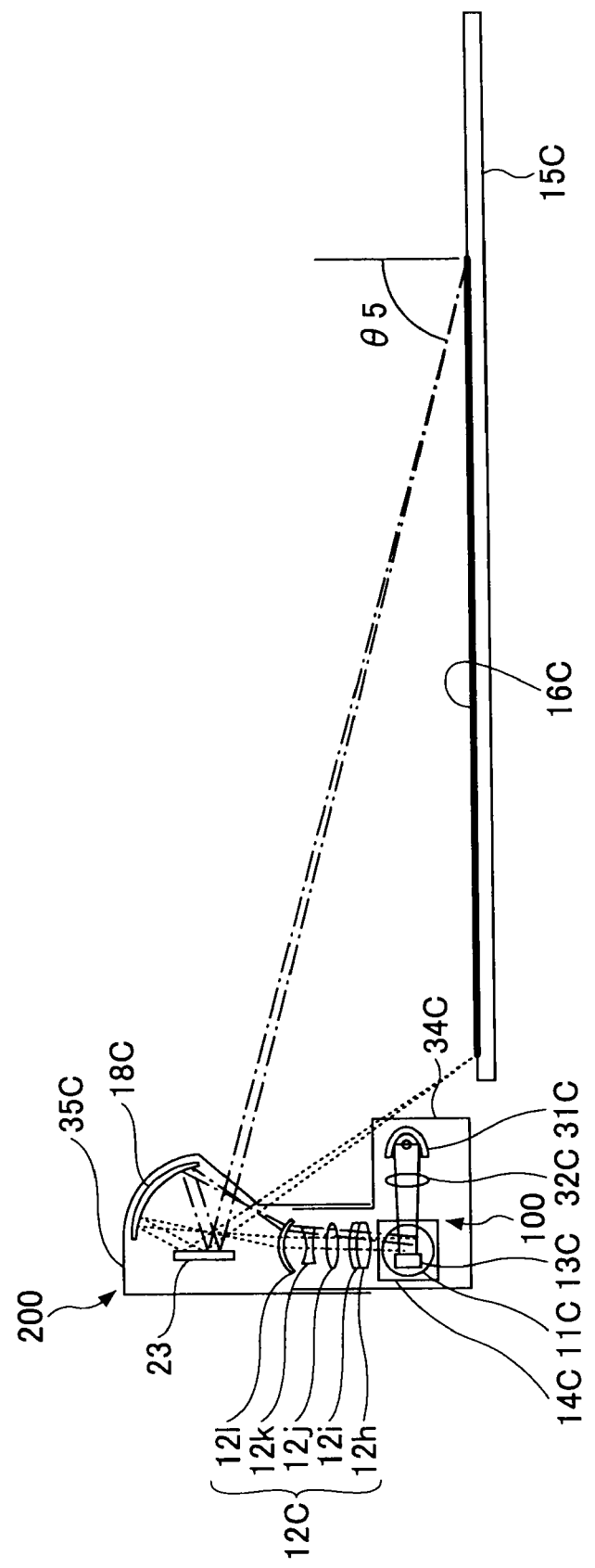

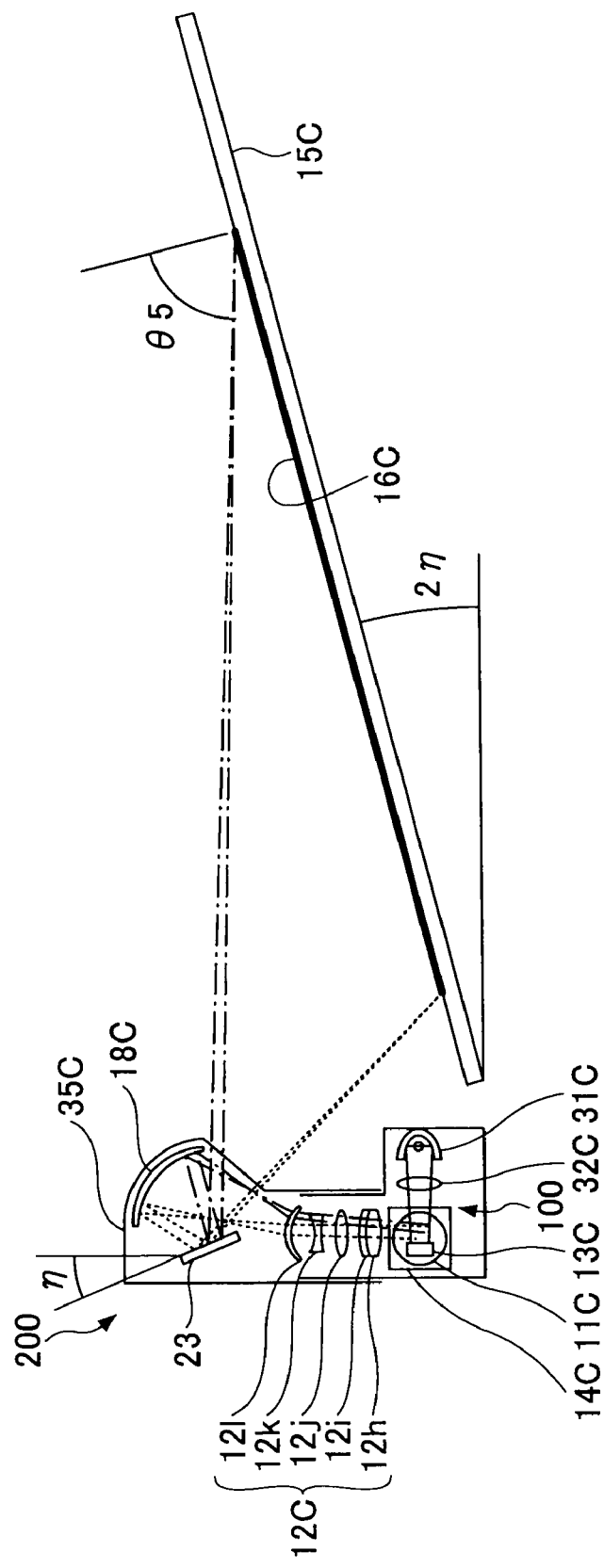

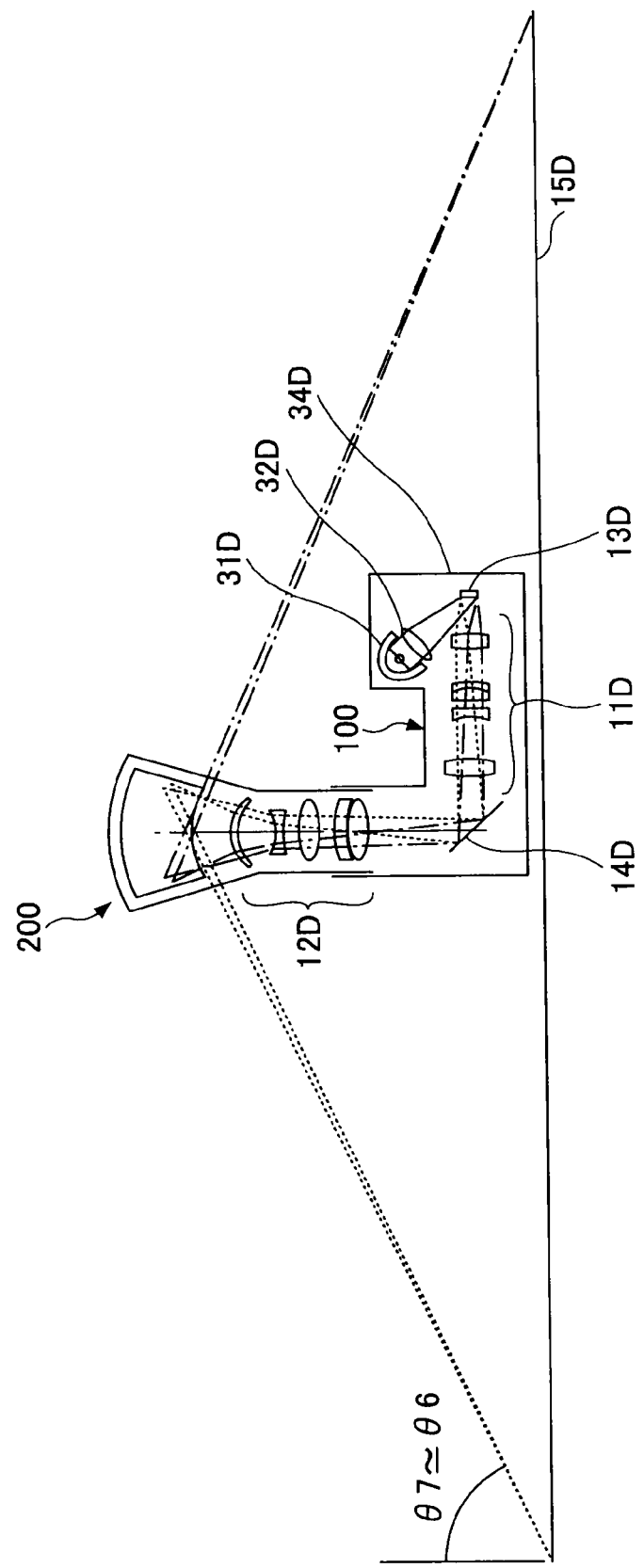

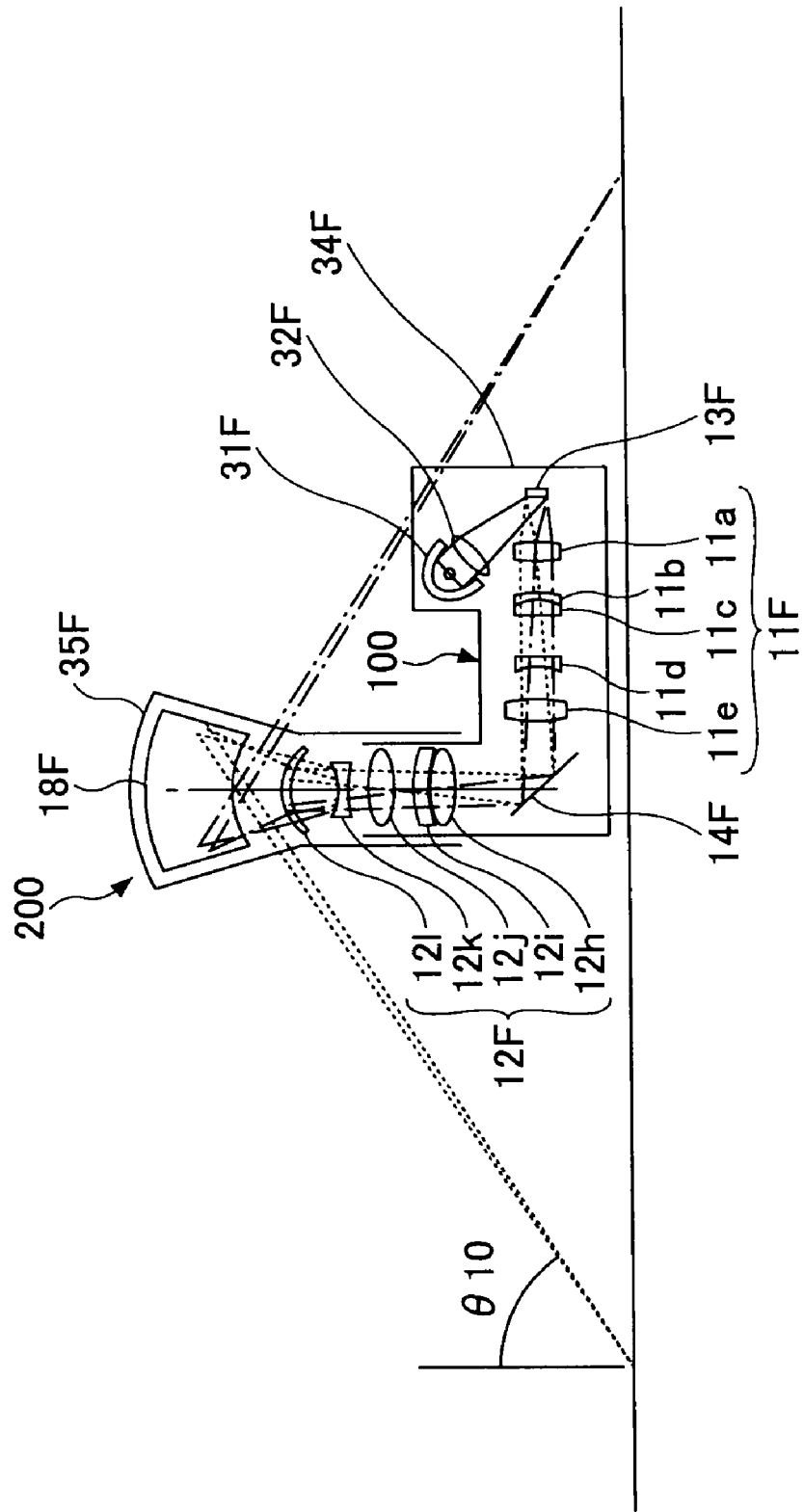

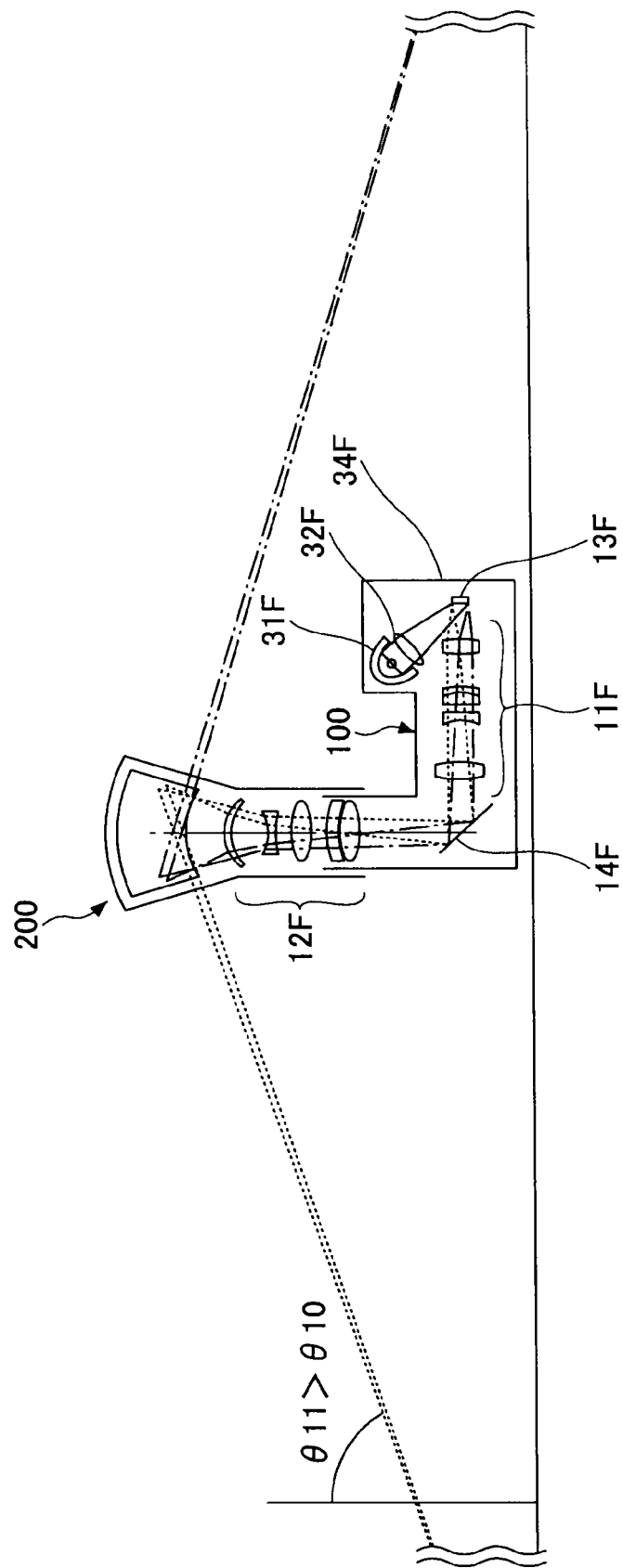

FIG.8

| PLANE NO. | | ROC | PLANE INTERVAL | REFRACTIVE INDEX | ABBE'S NUMBER | ASPHERICAL SURFACE | POLYNOMIAL FREE-FORM SURFACE | REFLECTING SURFACE | ECCENTRICITY/TILT | MOVEMENT BY MAGNIF'N CHANGE |
|---|---|---|---|---|---|---|---|---|---|---|
| OBJECT | | | 0.39 | | | | | | | |
| 1 | CG | | 2.13 | 1.517 | 64.2 | | | | | |
| 2 | | | 1.87 | | | | | | | |
| 3 | P | | 24.30 | 1.517 | 64.2 | | | | | |
| 4 | | | 2.00 | | | | | | | |
| 5 | L1 | 88.647 | 4.36 | 1.624 | 60.0 | | | | | |
| 6 | | -40.370 | 0.20 | | | | | | | |
| 7 | L2 | 21.391 | 6.87 | 1.790 | 27.0 | | | | | |
| 8 | L3 | 12.978 | 5.84 | 1.488 | 70.4 | | | | | |
| 9 | | -30.092 | 1.15 | | | | | | | |
| 10 | L4 | -23.570 | 1.00 | 1.641 | 23.4 | | | | | |
| 11 | | 36.639 | 12.11 | | | | | | | |
| 12 | L5 | -60.480 | 1.91 | 1.675 | 31.3 | | | | | |
| 13 | | -21.248 | 0.40 | | | | | | | |
| 14 | APERTURE | | 7.69 | | | | | | | |
| 15 | L6 | 39.894 | 1.00 | 1.785 | 25.7 | | | | | |
| 16 | | 28.362 | 0.74 | | | | | | | |
| 17 | L7 | 39.891 | 2.19 | 1.717 | 38.9 | | | | | |
| 18 | | -106.464 | 1.68 | | | | | | | |
| 19 | L8 | -163.844 | 3.80 | 1.531 | 55.8 | ○ | | | | |
| 20 | | 48.688 | 11.91 | | | ○ | | | | |
| 21 | L9 | 26.117 | 5.54 | 1.702 | 31.7 | | | | | |
| 22 | | 156.304 | 5.95 | | | | | | | ○ |
| 23 | L10 | -76.141 | 1.80 | 1.805 | 25.5 | | | | | |
| 24 | | 32.102 | 6.22 | | | | | | | ○ |
| 25 | L11 | -95.949 | 7.65 | 1.506 | 68.5 | | | | | ○ |
| 26 | M1 | -34.075 | 127.84 | | | | | ○ | ○ | ○ |
| 27 | | 816.996 | -263.82 | | | | ○ | | | ○ |
| IMAGE | | | 0.00 | | | | | | | |

FIG.9

| PLANE NO. | 19 |
|---|---|
| K | 0 |
| A | −7.59E−05 |
| B | 6.92E−07 |
| C | −1.86E−08 |
| D | 5.07E−10 |
| E | −8.04E−12 |
| F | 6.57E−14 |
| G | −2.15E−16 |

FIG.10

| PLANE NO. | 20 |
|---|---|
| K | 0 |
| A | −8.09E−05 |
| B | 3.99E−07 |
| C | −8.50E−10 |
| D | −1.25E−11 |
| E | 1.13E−13 |
| F | 6.63E−17 |
| G | −2.56E−18 |

FIG.11

| PLANE NO. | 27 |
|---|---|
| X2 | −6.03E−03 |
| Y2 | −3.02E−03 |
| X2Y | −3.00E−05 |
| Y3 | −1.88E−06 |
| X4 | 2.05E−08 |
| X2Y2 | −3.71E−07 |
| Y4 | −5.28E−07 |
| X4Y | −6.43E−09 |
| X2Y3 | −6.25E−09 |
| Y5 | 1.55E−08 |
| X6 | −1.86E−10 |
| X4Y2 | 3.79E−10 |
| X2Y4 | 4.37E−10 |
| Y6 | −2.20E−10 |
| X6Y | 7.32E−12 |
| X4Y3 | −1.01E−11 |
| X2Y5 | −1.53E−11 |
| Y7 | −2.24E−12 |
| X8 | 1.26E−13 |
| X6Y2 | −3.03E−13 |
| X4Y4 | −1.16E−13 |
| X2Y6 | 1.58E−13 |
| Y8 | 1.08E−13 |
| X8Y | −2.38E−15 |
| X6Y3 | 7.53E−15 |
| X4Y5 | 6.15E−15 |
| X2Y7 | −1.13E−16 |
| Y9 | −1.31E−15 |
| X10 | −2.69E−17 |
| X8Y2 | 2.69E−17 |
| X6Y4 | −7.27E−17 |
| X4Y6 | −4.98E−17 |
| X2Y8 | −6.27E−18 |
| Y10 | 5.29E−18 |

FIG.12

| 4TH ORDER COEFFICIENT | A |
| --- | --- |
| 6TH ORDER COEFFICIENT | B |
| 8TH ORDER COEFFICIENT | C |
| 10TH ORDER COEFFICIENT | D |
| 12TH ORDER COEFFICIENT | E |
| 14TH ORDER COEFFICIENT | F |
| 16TH ORDER COEFFICIENT | G |

FIG.13

| PLANE NO. | 5 |
| --- | --- |
| SHIFT IN Y DIRECTION (mm) | −2.08 |
| ROTATION IN YZ PLANE (°) | 0.0 |

FIG.14

| PLANE NO. | 27 |
|---|---|
| SHIFT IN Y DIRECTION (mm) | −67.15 |
| ROTATION IN YZ PLANE (°) | −46.6 |

FIG.15

| PLANE NO. | 35 INCHES | 30 INCHES | 25 INCHES |
|---|---|---|---|
| 14 | 7.69 | 5.64 | 1.00 |
| 18 | 1.68 | 3.73 | 6.32 |
| 20 | 11.91 | 4.92 | 0.80 |
| 24 | 6.22 | 13.21 | 19.37 |
| 26 | 127.84 | 113.32 | 98.45 |
| 27 | −263.82 | −249.21 | −234.23 |

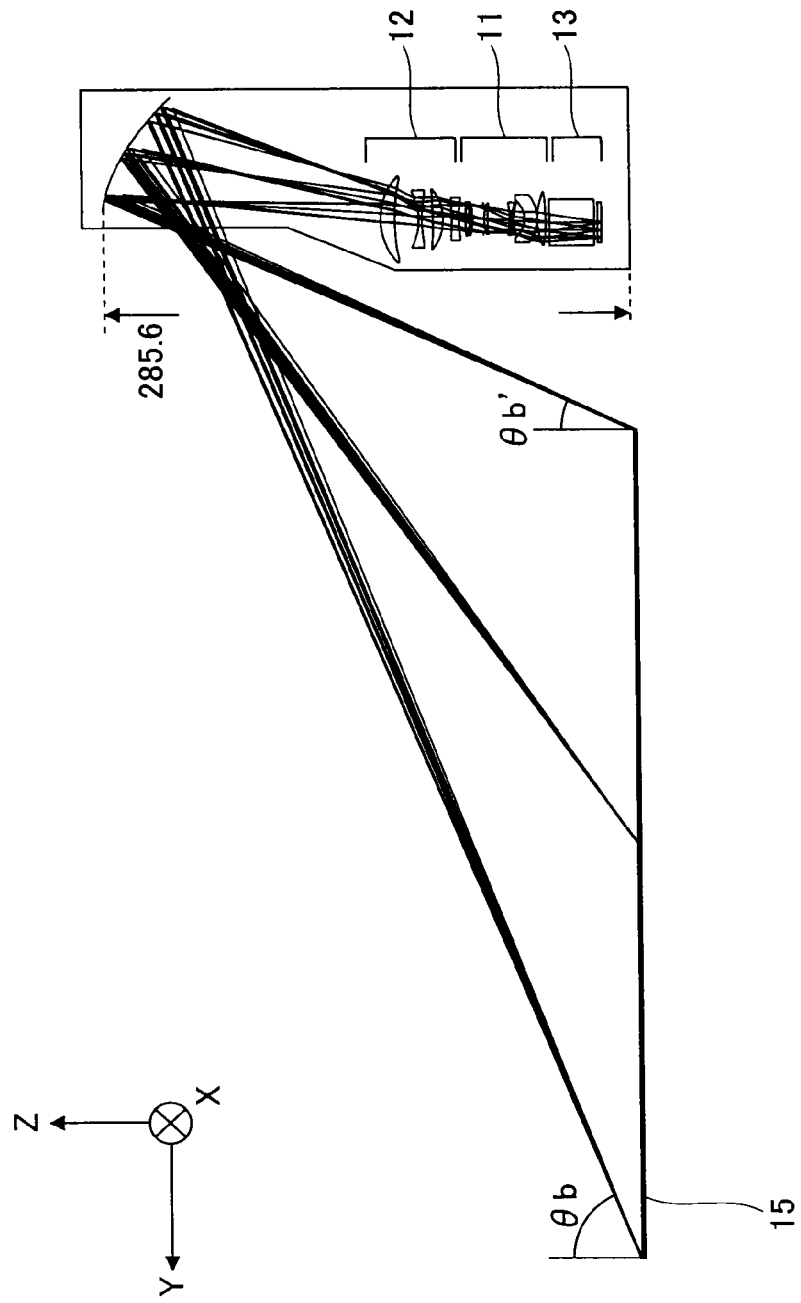

FIG.17

| PROJECTION SIZE | MAX. INCIDENT ANGLE (°) | MIN. INCIDENT ANGLE (°) | DIFFERENCE (°) |
|---|---|---|---|
| 35 INCHES | 69.4 (θa) | 25.6 (θa') | 43.8 |
| 30 INCHES | 67.4 (θb) | 23.9 (θb') | 43.5 |
| 25 INCHES | 66.0 (θc) | 22.8 (θc') | 43.2 |

FIG.19

| PROJECTION SIZE | MAX. ANGLE OF PROJECTION LIGHT (°) | MIN. ANGLE OF PROJECTION LIGHT (°) | DIFFERENCE (°) |
|---|---|---|---|
| 35 INCHES | 19.25 (θA) | 3.67 (θA') | 15.58 |
| 30 INCHES | 18.62 (θB) | 3.50 (θB') | 15.12 |
| 25 INCHES | 18.54 (θC) | 3.43 (θC') | 15.11 |

VARIABLE MAGNIFICATION OPTICAL SYSTEM AND PROJECTOR

BACKGROUND OF THE INVENTION

1. Field of the Invention

The present invention generally relates to variable magnification optical systems. Particularly, the present invention relates to a variable magnification optical system for increasing or decreasing the size of an image on an object plane, a projector using such a variable magnification optical system, and a reading apparatus.

2. Description of the Related Art

A projector is known that projects an image formed by an image forming unit onto a screen as an enlarged image. Desirably, the size of such a projector should be reduced as much as possible so that it can be installed as near the screen as possible. Japanese Laid-Open Patent Application Nos. 2008-096983 ("Patent Document 1") and 2008-096984 ("Patent Document 2") propose large-magnification optical systems which are entirely or partly (hybrid) constructed of an optical system including a mirror with a certain power. In both of these known systems, the mirror with a certain power is disposed in the final stage of a lens system (i.e., at a position closest to the screen along the optical path), and a very wide projected angle is realized by a high deflecting function of the mirror.

In the above optical systems according to Patent Documents 1 and 2, the maximum angle of view of more than 70° with respect to the screen can be obtained. Thus, depending on the design, projected magnification of more than 1.4 times can be obtained by changing a projection distance between the projector main body and the projected plane by as little as a few dozen centimeters. Namely, an image can be enlarged and projected onto a large screen at a very short distance, whereby the magnification ratio can be easily changed by a very small change in projection distance.

However, in order to provide such optical systems with a variable magnification function that does not require a change in the projection distance, a plurality of lens elements need to be moved. For example, Japanese Laid-Open Patent Application No. 2004-295107 ("Patent Document 3") discloses an optical system in which a wide-tele zoom drive is performed by a variable magnification optical system.

In this optical system, an intermediate image is formed by a refracting system, reflected by a concave mirror, and then projected onto a screen as an enlarged image. The image formed by the refracting system is located closer to the screen than to the reflecting plane on which the image is next incident. In this optical system, plural lenses of which the refracting system is composed are moved parallel to the optical axis, thus forming a zooming optical system.

As an optical system in which only mirrors are used, Japanese Laid-Open Patent Application No. 2005-189768 ("Patent Document 4") discloses a technology whereby a group of mirrors is moved for zooming and focusing. In this optical system, a light beam whose optical intensity is modulated by a light valve is projected onto a screen via plural curved reflective mirrors. The plural mirrors are moved in a coordinated manner to change the projected angle of view, thereby obtaining wide-angle-, middle-, and telephoto-images.

Japanese Laid-Open Patent Application No. 2006-184591 ("Patent Document 5") discloses a technology for changing the magnification of a projected image by changing the projection distance L, without changing the projected angle of view. In this technology, the entire projector apparatus, including a projecting unit, optical systems, an LCD image generating unit, a light source lamp, and an illuminating optical system, is moved to change the projection distance.

In the optical system according to Patent Document 3, the concave mirror is fixed and a lens system of which the refracting system is composed is moved along the optical axis in order to provide a zooming optical system. Thus, the angle of view with respect to the screen is not constant, and the size of the concave mirror needs to be set for the wide-angle side. As a result, the size of the concave mirror increases.

In the optical system according to Patent Document 4, magnification is changed by changing the projected angle of view. Namely, the projected angle of view needs to be changed for zooming. Changing the projected angle of view results in an increase in the area of the final mirror, as in the case of Patent Document 3, because at the wide-angle end, the width of the projecting light beam is larger than at the telephoto end. Specifically, in order to accommodate wider-angle images, the size of the final mirror needs to be set for the wide-angle end, thus necessitating a larger-sized mirror.

A larger mirror requires greater precision during manufacture, resulting in an increased manufacturing cost for achieving a required level of performance. The greater size of the lens also results in a larger size of the system as a whole.

In the projector according to Patent Document 5, the projection distance cannot be changed unless the entire apparatus is lifted. The projector also requires a support unit strong enough to withstand the weight of the apparatus. When the apparatus is lifted, so is the center of gravity, thus making the apparatus unstable, which is not desirable when the projector is to be placed on top of a table or the like.

SUMMARY OF THE INVENTION

It is a general object of the present invention to provide a variable magnification optical system and a projector in which one or more of the aforementioned problems of the related art are eliminated.

A more specific object of the present invention is to provide a variable magnification optical system and a projector by which an image can be projected with a sufficient magnification without requiring a large mirror.

According to an embodiment of the present invention, a variable magnification optical system includes a reflective optical element having a positive magnification power and configured to be movable relative to an object plane; and a refractive optical system configured to form an intermediate image between the object plane and the reflective optical element, the refractive optical system including plural refractive optical elements. A substantially constant magnification of the intermediate image is maintained before and after a magnification change by a movement of the reflective optical element by moving at least one of the plural refractive optical elements.

According to another aspect, a variable magnification optical system for projecting an image onto a screen includes a first optical system through which a light beam irradiated from an object plane is passed; a second optical system disposed downstream of the first optical system in a direction of travel of the light beam along an optical axis; and a reflective optical element having a magnification power that is configured to reflect the light beam from the second optical system toward the screen. A magnification of the image projected on the screen is changed by moving the reflective optical element relative to the object plane, thus changing a distance between the screen and the reflective optical element, while an incident angle of the light beam on the screen is maintained substantially constant.

BRIEF DESCRIPTION OF THE DRAWINGS

Other objects, features and advantages of the present invention will become apparent upon consideration of the specification and the appendant drawings, in which:

FIG. 1 shows a variable magnification optical system according to an embodiment of the present invention;

FIG. 2 shows the variable magnification optical system set for a greater magnification ratio than in FIG. 1;

FIG. 3A shows a projector according to a second embodiment of the present invention with a minimum magnification;

FIG. 4A shows a projector according to a third embodiment of the present invention having a projecting optical path deflecting element;

FIG. 4B shows the projector according to the second embodiment, with a reduced projecting space;

FIG. 5B shows the projector according to the fourth embodiment on an enlarged image end;

FIG. 7A shows a projector according to a sixth embodiment of the present invention, on a reduced image end;

FIG. 7B shows the projector of the sixth embodiment, on an enlarged image end;

FIG. 8 shows a table of various parameters of a variable magnification optical system according to an embodiment of the present invention;

FIG. 9 shows a table of aspheric surface coefficients of a plane number 19;

FIG. 10 shows a table of aspheric surface coefficients of a plane number 20;

FIG. 11 shows a table of coefficients of a polynomial free-form surface of a plane number 27;

FIG. 12 shows a table of orders corresponding to coefficients A to G;

FIG. 13 shows a table of data concerning eccentricity and tilt in a plane number 5;

FIG. 14 shows a table of data concerning eccentricity and tilt in a plane number 27;

FIG. 15 shows a table of values of plane intervals between various planes at various projected sizes when the projected magnification is 1.4;

FIGS. 16A to 16C show optical paths when the projected size is 35 inches, 30 inches, and 25 inches, respectively;

FIG. 17 shows a table of values of the maximum and minimum incident angles on the screen;

FIG. 19 shows a table of the maximum and minimum projecting light angles;

DETAILED DESCRIPTION OF THE PREFERRED EMBODIMENTS

Figure 3B:
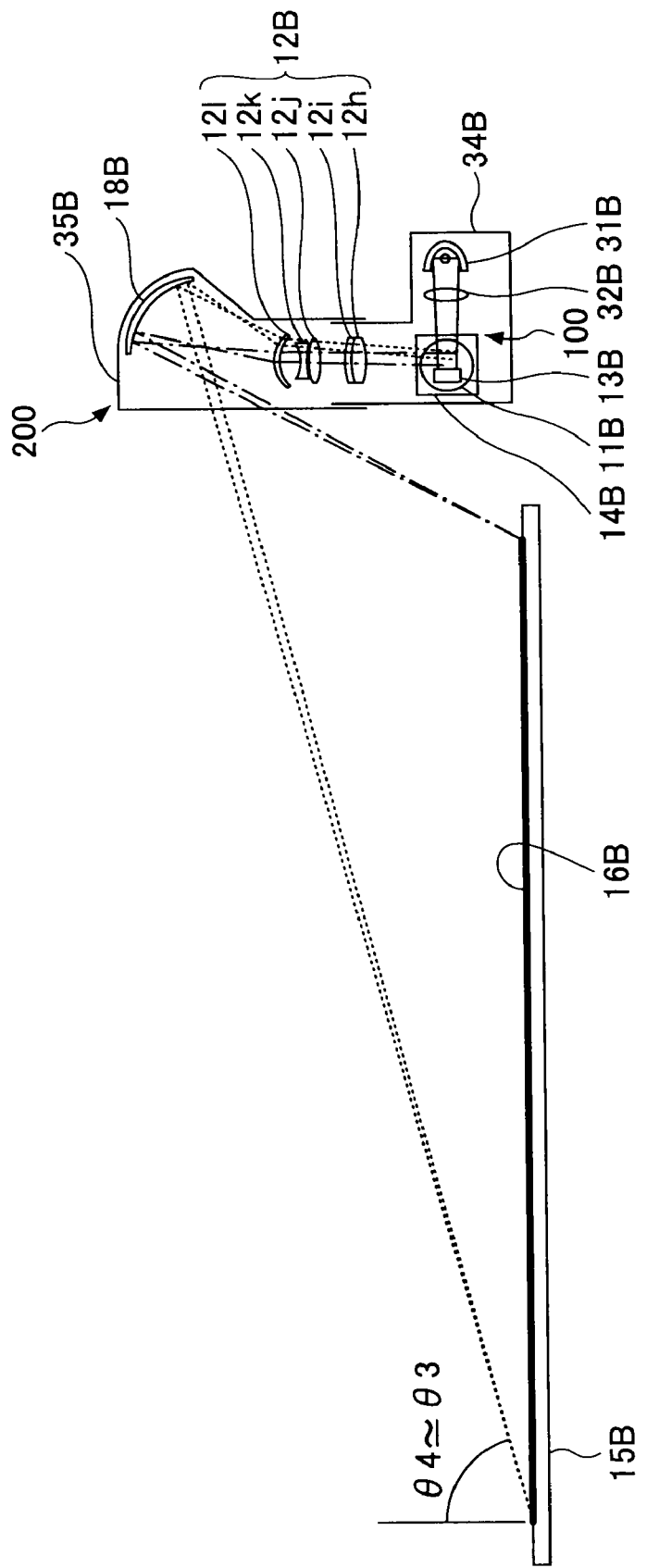
FIG. 3B shows the projector according to the second embodiment with a maximum magnification.

Hereafter preferred embodiments of the present invention are described with reference to the drawings, in which like reference numerals designate identical or corresponding parts throughout the several views.

Embodiment 1

First referring to FIG. 1, a variable magnification optical system 100 according to a first embodiment of the present invention is described. The variable magnification optical system 100 includes an image generating unit 13 for generating an image; a first optical system 11 having plural refractive optical elements with a common optical axis; a second optical system 12 having plural refractive optical elements with a common optical axis; and a reflective optical element 18 with a certain power.

The optical path of the light that has passed through the second optical system 12 is folded by the reflective optical element 18 so that an enlarged image can be projected on a screen 15 disposed on a projected plane. The first optical system 11 and the second optical system 12 constitute a refractive optical system for forming an intermediate image 19.

The projected plane may or may not be a constituent element of the variable magnification optical system 100. In other words, the variable magnification optical system 100 and the projected plane may or may not be handled together during shipping or distribution. When the projected image plane is a constituent element, the variable magnification optical system 100 and the projected plane may communicate with each other via a wired or wireless technology.

When the projected plane is a constituent element of the variable magnification optical system 100, the projected plane may be aligned with the projected image by moving the projected plane with respect to the object plane using an appropriate mechanism. Such a mechanism may include a motor for moving the projected plane perpendicularly to the projected plane, and a support member. The mechanism may be instructed to move the projected plane within a range in which an image can be focused by image processing involving edge intensity detection or the like.

When the projected plane is not a constituent element of the variable magnification optical system 100, the entire variable magnification optical system 100 may be moved by an appropriate known mechanism with respect to an enclosure of the system, so that the projected image can be aligned with the projected plane. The known mechanism may include wheels attached to the bottom of the variable magnification optical system 100 and a motor for rotating the wheels. In this way, the variable magnification optical system 100 can be moved relative to the projected plane within a range such that an image can be focused by image processing involving edge intensity detection or the like.

Further, when the projected plane is not a constituent element of the variable magnification optical system 100, the entire variable magnification optical system 100 may be moved with respect to the projected plane by the user in order to align the projected image with the projected plane. The projected image only needs to be projected toward the projected plane and does not necessarily need to be formed on the projected plane (such as when the projected plane is transparent or a mirror, for example).

In the present embodiment, the reflective optical element 18 can be moved parallel to the sheet of the drawing, so that the distance between the reflective optical element 18 and the projected plane, i.e., the screen 15, can be changed without moving the entire variable magnification optical system 100. By changing the projection distance between the reflective optical element 18 and the screen 15, various projected magnification ratios can be obtained. Because the projected angle of view (which is the difference between the maximum and minimum incident angles of light beam) does not change even when the projected magnification is varied (i.e., when the projection distance is changed), the size of the reflective optical element 18 does not need to be set for the wide-angle end, so that the reflective optical element 18 can be reduced in size.

In the following, the variable magnification optical system 100 is described in greater detail. The light beam emitted from the image generating unit 13 disposed at the object plane passes through the prism portion 10, the first optical system 11, the optical path changing element 14, and the second optical system 12, forming an intermediate image 19 having a negative magnification ratio. Thereafter, the optical path of the light beam is folded by the reflective optical element 18 having a positive power, so that a projected image 16 is formed on the screen 15 with a certain magnification ratio. The projected image 16 and the image generating unit 13 have a conjugate positional relationship (i.e., the projected image 16 and the image generating unit 13 are conjugate planes).

The image generating unit 13 includes plural image forming elements referred to as light valves, which are arranged two-dimensionally at pixel pitches. Based on an input video signal, a control circuit (not shown) produces a drive signal that is supplied to the image generating unit 13 so that the image generating unit 13 can be driven on a pixel by pixel basis. In this way, the illuminating light is modulated, producing a projected image that reflects the input video signal. Relevant image information may be stored in a recording medium (not shown) or received via a reception unit (not shown).

The image generating unit 13 may be implemented as a digital mirror device configured to turn on and off light using minute mirrors arranged on a pixel unit basis. Because such a digital mirror device is not a light-emitting device, illuminating light is externally supplied, using, for example, a lamp light source and an illuminating optical system that are typically used in an LCD projector (see the second embodiment).

The prism portion 10 includes an optical path separating portion 10a that may include a polarizing beam splitter for separating the projecting light from the illuminating light. The prism portion 10 further includes a color composing element 10b that may include a dichroic prism for composing a plurality of items of information from the image generating unit 13. It goes without saying that the optical path separating portion 10b is not needed when the system employs a light-emitting panel, a transmissive LCD panel, or a digital mirror device that allows a layout such that the illuminating light and the projecting light can be separated by shining the illuminating light in an inclined manner. Further, the color composing element 10b is not needed when the image generating unit 13 does not include multiple elements, such as when color information can be generated by a single image generating element.

The first optical system 11 includes plural optical elements 11a to 11g that are arranged vertically with respect to a common optical axis. In the example shown in FIG. 1, seven refracting lenses are used. One or more of the optical elements 11a to 11g may be shifted or tilted. The relative positions of the optical elements 11a to 11g and their positions relative to the prism portion 10 or the optical path changing element 14 are maintained constant at all times. The first optical system 11 may be fixed in place by a so-called lens cell, which is not shown in FIG. 1. The optical elements 11a to 11g may be made of glass or plastic transparent material.

The light beam (imaging light beam) emitted from the image generating unit 13 is collected by the first optical system 11. The collected light beam is incident on the optical path changing element 14. Preferably, the optical path changing element 14, which reflects the light beam from the first optical system 11 toward the second optical system 12, includes a planar mirror having as high a reflectivity as possible. When the first optical system 11 and the second optical system 12 are arranged in series, the optical path changing element 14 may be dispensed with. The location of the optical path changing element 14 is not limited to between the first optical system 11 and the second optical system 12 but may be disposed at any desired location where the optical path needs to be changed in a desired direction. A plurality of the optical path changing elements 14 may be arranged.

In the example shown in FIG. 1, the screen 15 is vertically disposed with the variable magnification optical system 100 disposed therebelow, where the optical axis of the first optical system 11 is disposed vertically and the optical axis of the second optical system 12 is disposed perpendicularly to the screen 15. Alternatively, the image generating unit 13 and the first optical system 11 may be disposed beside the screen 15 such that the optical axis of the first optical system 11 is perpendicular to the sheet of the drawing.

The second optical system 12 includes plural optical elements 12a to 12e that are arranged along a common optical axis. In the example of FIG. 1, five refracting lenses are used, of which the optical elements 12b and 12c are integrally attached to each other. One or more of the optical elements 12a to 12e may be shifted or tilted. The plural optical elements 12a to 12e may be individually moved along the optical axis.

The light beam that has passed through the last optical element 12e of the second optical system 12 forms the intermediate image 19, which is internally curved toward the screen 15, as shown in FIG. 1, with a negative magnification ratio (the intermediate image 19 is focused between the optical element 12e and the reflective optical element 18). Thereafter, the light beam diverges from the plane of the intermediate image, and becomes incident on the reflective optical element 18.

Preferably, the reflective optical element 18 having a positive power includes a concave mirror with an aspheric surface for correcting for various aberrations. In order to eliminate or reduce distortion in the projected image and obtain a desired resolution, the reflective optical element may be configured as follows. Namely, in order to take advantage of the reflective optical element 18 being a mirror with its characteristic optical deflecting capability, the reflective optical element 18 is shaped such that its magnification and distortion performance can be maximized. Further, the first optical system 11 and the second optical system 12 are adjusted in terms of shape, arrangement, aberration performance, magnification ratio, and the like so that a desired resolution can be obtained.

Preferably, the reflective optical element 18 includes a free-form surface mirror in order to achieve appropriate light-collecting performance depending on the angle of view. By so doing, an enhanced aberration correcting function can be obtained, whereby better image quality can be obtained. In order to obtain optimized optical performance, a known light beam tracking simulation technology may be employed to balance the optical system size, tolerance setting, etc., and performance.

The optical path of the light beam diverging from the intermediate image plane is folded by the reflective optical element 18, and then collected on the screen 15 located at a desired projected position, thus forming a projected image 16. Although the intermediate image 19 may not be formed in a flat plane, this is not a problem as various aberrations are corrected and desired optical performance is obtained by the optical system as a whole, including the first optical system 11, the second optical system 12, and the reflective optical element 18 with positive power.

Thus, the projected image 16 that is an enlargement of the image generated by the image generating unit 13 is formed on the screen 15. By reducing or increasing the projection distance D1 between the screen 15 and the reflective optical element 18, the magnification ratio of the projected image 16 can be changed. Namely, by moving the reflective optical element 18, the magnification ratio of the projected image 16 can be changed without changing the projected angle of view.

With reference to FIG. 1, the projected angle of view is described. The distance between the plane of the screen 15 and a predetermined reference position of the image generating unit 13 is T1. The distance between the plane of the screen 15 and a predetermined reference position of the reflective optical element 18 is D1. The angle of incidence of the light beam 22 from the lower edge of the reflective optical element 18 on the screen 15 is $\theta 1$.

$\theta 1$ is the maximum incident angle on the screen 15 in a plane including a cross section including the optical axis of the first optical system 11 or the second optical system 12. $\theta 1$ is normally obtained at a position on the projected screen that is the farthest from the optical system. On the other hand, $\theta 1'$ is the minimum incident angle on the screen 15, which is normally obtained at a position closest to the optical system.

In the variable magnification optical system 100 according to the present embodiment, by moving the reflective optical element 18, $\theta 1$ is maintained substantially constant regardless of the magnification ratio. Alternatively, the difference between $\theta 1$ and $\theta 1'$, i.e., the difference between the maximum and minimum incident angles, may be maintained substantially constant even though either $\theta 1$ or $\theta 1'$ may change a little.

FIG. 2 shows the variable magnification optical system 100 when the magnification ratio is increased from FIG. 1 by moving the second optical system 12 and the reflective optical element 18 away from the screen 15 shown in FIG. 1.

In FIG. 2, the distance between the reflective optical element 18 and the screen 15 is D2, where the image is enlarged while the incident angle $\theta 1$ of the light beam 22 incident on the upper edge of the screen 15 is maintained substantially constant. Namely, the incident angle $\theta 2$ of the light beam 22 on the screen 15 in FIG. 2 is substantially the same as $\theta 1$. It should be noted that the magnification ratio of the projected image 16 is changed by simply changing the projection distance from D1 to D2.

Because the incident angle of view is substantially the same regardless of the magnification ratio, an effective reflecting area 18R of the reflective optical element 18, by which the intermediate image 19 is reflected, does not change much between FIGS. 1 and 2. Because the reflective optical element 18 is moved together with the second optical system 12, the relative position of the intermediate image 19 to the reflective optical element 18 hardly changes.

Further, in accordance with the present embodiment, a focal position error is corrected by appropriately changing the intervals of the individual optical elements in the second optical system 12 during enlargement or reduction, depending on the change in projected position. The amount of movement of the optical elements in the second optical system 12 is optimized so that the image can be focused on the screen 15 at all times between D1 (which may be the minimum distance) and D2 (which may be the maximum distance). The individual optical elements 12a to 12e in the second optical system 12 may be moved by different amounts in order to correct for various aberrations. It goes without saying that the individual optical elements 12a to 12e may be optimized by the same amount of movement; however, in order to reduce the size of the apparatus and achieve enhanced performance, the optical elements may more often than not have to be moved by different amounts.

The maximum zoom value may vary depending on the number of the lenses in the variable magnification optical system 100 and various tolerances (shape, refractive index, aberration) of the lenses. However, realistically, a maximum of 1.3× zoom optical system can be obtained by using a total of 12 optical elements in the first optical system 11 and the second optical system 12 and one surface of the reflective optical element 18. By increasing the number of lenses and thus attaining greater freedom of design, the magnification ratio of the variable magnification optical system 100 may be further increased.

By employing a number of aspheric surfaces on the lens surfaces in combination with more complex free-form surfaces or eccentricities (such as by tilting or shifting), the size of the optical system or the number of lenses may be further reduced.

The variable magnification optical system 100 according to the present embodiment is particularly effective when the projected angle of view is about 50° or more because the image size can be changed with a smaller change in projection distance. For example, the angle of view of a projecting lens that projects the image size of 60 inches on the screen surface from a position 1.2 m from the screen, when calculated in terms of a ratio of screen diagonal distance to projection distance, is 60 inches×2.54/120 cm=1.27, which is about 51°.

If the installed position of the projector 200 equipped with the variable magnification optical system 100 is moved backward 10 cm along the projection direction with the aforementioned ratio, the image size is {(120 cm+10 cm)×1.27}/2.54=65 inches, which is a nearly 10% change in screen size. That is, the effect is equivalent to a 1.1× zooming. As the focal length becomes shorter or the angle of view increases in the variable magnification optical system 100, a greater amount of change can be caused in projected magnification by the same amount of change in projection distance.

As discussed above with reference to Patent Documents 1 and 2, recent optical systems often have the maximum angles of view of more than 70°, so that the magnification ratio can be changed greatly by a small change in projection distance. Specifically, it is possible, depending on the design, to bring about a change of 1.4 times or more in projected magnification by a change of a few dozen centimeters in projection distance.

It is known that the screen shape becomes a trapezoid instead of a rectangle (the so-called keystone effect) if there is a slight error in projected position, particularly if the projector is not parallel to the screen 15. A slight change in the angle of projection from the projector causes a greater keystone effect, which is a distortion in the shape of a projected image, as the angle of view increases. In a conventional projector technology whereby the entire projector is moved, a mechanism is required for moving the entire projector while maintaining a parallel relationship with the screen 15 in order to eliminate such a distortion, resulting in an increase in the size of the entire system.

In accordance with the present embodiment, only a part of the variable magnification optical system 100 needs to be moved. Thus, the projection distance can be changed without moving the image generating unit 13 or the illuminating system, while maintaining a precise parallel relationship with the screen 15, thus preventing the distortion in the projected image 16.

As described above, in the variable magnification optical system 100 of the present embodiment, the reflective optical element 18 alone is moved along the optical axis, so that the projected magnification can be changed without changing the projected angle of view. Thus, an increase in size of the reflective optical element 18 can be prevented, and the size of a system equipped with the variable magnification optical system 100 can also be reduced. Further, because the mirror size (the size of the reflective optical element 18) can be reduced, manufacturing cost can be reduced. In addition, because the projected angle of view can be maintained substantially constant, a change in the amount of peripheral brightness as a result of a change in the projected magnification can be prevented.

Embodiment 2

A projector 200 including the variable magnification optical system 100 of the first embodiment is described. Referring to FIG. 3A, the projector 200 includes the variable magnification optical system 100, a light source 31B, an illuminating optical system 32B for efficiently illuminating the light beam emitted from the light source 31B, an image generating unit 13B, a first optical system 11B, an optical path deflecting element 14B, a second optical system 12B, and a reflective optical element 18B with a certain power.

The light source 31B may include a white-light source such as an extra high-pressure mercury lamp, a xenon lamp, a halogen lamp, or an LED; or a monochromatic light source, such as a monochromatic LED or a laser diode. In the case of a white light source, a color-separating optical system is needed. In order to generate a color image, the light source 31B may be provided for each of the colors of R, G, and B.

The illuminating optical system 32B has the function of efficiently illuminating the image generating unit 13B. The illuminating optical system 32B may include a fly's eye integrator optical system or a rod integrator for obtaining a uniform distribution of illumination.

The image generating unit 13B preferably includes a transmissive LCD panel, a reflective LCD panel, or a digital mirror device that turns on and off light using minute mirrors arranged on a pixel unit basis. In the case of the digital mirror device, because the device is not a light-emitting element, the panel needs to be illuminated with external illuminating light, such as from the light source 31B or the illuminating optical system 32B. In the case of a light-emitting panel, the light source 31B and the illuminating optical system 32B are not needed.

The first optical system 11B is similar to the first optical system 11 of the first embodiment with the exception of the direction of the optical axis. Specifically, in FIG. 3A, the optical elements 11a to 11g of the first optical system 11B are arranged perpendicularly to the sheet of the drawing, so that not all of the plural optical elements 11a to 11g are visible.

The second optical system 12B is also similar to the second optical system 12 of the first embodiment. Specifically, as shown in FIGS. 3A and 3B, the second optical system 12B includes five optical elements; namely, refracting lenses 12h to 12l, of which the optical elements 12h and 12i are integrally attached to each other.

The diverging light beam emitted from the image generating unit 13B is collected by the first optical system 11B and guided toward the second optical system 12B. Because the optical axis of the first optical system 11B is perpendicular to the sheet of the drawing, an optical path deflecting element 14B for bending the optical axis toward the second optical system 12B is disposed between the first optical system 11B and the second optical system 12B, whereby the light beam is bent perpendicularly to the screen 15B.

Thus, the optical axis of the second optical system 12B is perpendicular to the screen 15B. The light beam that has passed through the second optical system 12B forms a spatial image (intermediate image, not shown) whose size is equal to or greater than the image generating unit 13B, which includes the object plane.

The reflective optical element 18 enlarges the intermediate image 19 and forms a projected image 16B on the screen 15B with a desired magnification. As in the first embodiment, the intermediate image is not formed in a plane at the reflective optical element 18B. However, this is not a problem as desired optical performance may be obtained by correcting various aberrations with the entire optical system, including the reflective optical element 18B with a certain power, the first optical system 11B, and the second optical system 12B.

Preferably, the reflective optical element 18B includes a concave mirror having an aspheric surface for correcting for various aberrations. Further, the reflective optical element 18B may adopt a free-form surface shape for active correction of distortions.

In the projector 200, the variable magnification optical system 100 is encased. Specifically, the light source 31B, the illuminating system 32B, the image generating unit 13B, and the first optical system 11B of the variable magnification optical system 100 are enclosed in a base unit 34B of the projector 200. In particular, the image generating unit 13B and the first optical system 11B are fixed to the base unit 34B. The second optical system 12B and the reflective optical element 18B are integrally retained within a lens tube 35B.

As shown in FIGS. 3A and 3B, the lens tube 35B is slidable relative to the base unit 34B along the optical axis of the second optical system 12B. Alternatively, the lens tube 35B may be configured to be movable within the base unit 34B in a telescopic fashion.

Enlargement of an image by the projector 200 is described. FIG. 3B shows the projector 200 when the largest magnification is obtained. When the lens tube 35B is closest to the base unit 34B, as shown in FIG. 3A, the size of the projected image 16B is minimum. As the lens tube 35B in which the second optical system 12B and the reflective optical element 18B are integrally retained is extended away from the screen 15B, the reflective optical element 18B moves away from the screen 15B, with an increase in projection distance.

In the second optical system 12B, the lens intervals or the like of the optical elements 12a to 12e are adjusted by a focusing mechanism so that an enlarged image can be correctly imaged at a desired projected position. The focus may be adjusted after the reflective optical element 18B has been moved, i.e., after the projection distance has been changed. Optionally, the positions of the optical elements in the second optical system 12B may be adjusted in a coordinated manner in accordance with the change in the projection distance so that an optimum image plane can be maintained at the position of focus at all times.

In this way, the incident angle θ3 of the light beam on the screen 15B in FIG. 3A is substantially the same as the incident angle θ4 of the light beam on the enlarged end in FIG. 3B (θ3≈θ4).

Thus, in the projector 200 of the present embodiment, magnification of the projected image 16B can be changed without increasing the size of the reflective optical element 18B, thus enabling the projector 200 to be reduced in size. Further, because the second optical system 12B and the reflective optical element 18B are integrally retained by a lens tube, a magnification-changing operation and a focusing operation can be performed simultaneously.

Embodiment 3

In the first and second embodiments, an enlarged image is projected on the screen 15 directly from the reflective optical element 18. In the third embodiment, a mirror (projecting optical path deflecting element 23) that has no power is disposed on the projecting optical path between a reflective optical element 18C and a screen 15C, so that an enlarged image can be projected after the optical path is bent. By placing the projecting optical path deflecting element 23 having no power, the projecting direction can be selected, or two projected screens may be employed. Further, by rotating the projecting optical path deflecting element 23, the size of the projecting space can be reduced, whereby an improved operability of the projector 200 can be obtained.

FIG. 4A shows the projector 200 having the projecting optical path deflecting element 23. FIG. 4B shows the projector 200 in which the projecting space is reduced by using the projecting optical path deflecting element 23.

The variable magnification optical system 100 according to the present embodiment includes a light source 31C, an illuminating optical system 32C, an image generating unit 13C, a first optical system 11C, an optical path deflecting element 14C, a second optical system 12C, a reflective optical element 18C, and a projecting optical path deflecting element 23. At least the light source 31C, the illuminating optical system 32C, the image generating unit 13C, and the first optical system 11C are retained by a base unit 34C. The second optical system 12C and the reflective optical element 18C are integrally retained in a lens tube 35C.

As shown in FIGS. 4A and 4B, the light beam is deflected by the projecting optical path deflecting element 23, so that the relative positions of the screen 15C and the projector 200 are different from the corresponding positions shown in FIG. 3. However, the distance between the screen 15C and the reflective optical element 18C is about the same as the corresponding positions in FIG. 3.

The third embodiment is similar to the second embodiment with the exception of the projecting optical path deflecting element 23. Thus, the following description is mainly concerned with the projecting optical path deflecting element 23. Although the mechanism of imaging is the same as in the second embodiment, the present embodiment employs a method of projecting an image that is different from that of the second embodiment.

Specifically, as shown in FIGS. 4A and 4B, the projecting light is reflected once by the reflective optical element 18C and it then intersects the imaging light beam passing between the second optical system 12C and the reflective optical element 18C. The projecting light is eventually projected from the right side of the lens tube 35C as shown.

Preferably, the projecting optical path deflecting element 23 includes a total reflection planar mirror; however, it may include a semi-transparent planar mirror. In the case of a semi-transparent planar mirror, the light beam incident from the reflective optical element 18C can be divided in two directions across (i.e., symmetrically with respect to) the projector 200. Instead of using either the total reflection planar mirror or the semi-transparent planar mirror in a fixed manner, a single projecting optical path deflecting element 23 may be used and its property can be switched for transmission and reflection. Such a reflective optical path deflecting element 23 may be realized by switching the openings of liquid crystal pixels at high speed. The projected image 16C in one of the two directions from the reflective optical path deflecting element 23 is an inverted image. By correcting the inverted image into a normal image (such as by reflecting it once again by a mirror), the same image can be displayed on two screens. The projecting optical path deflecting element 23, when it projects the projecting light in two directions, is preferably detachable or retractable within the projector 200 so that it does not interfere with the optical path.

By thus making it possible to select the direction of the projected image 16, the projector 200 can be used with increased convenience. For example, the projector 200 may be placed on a table so that the projected image 16C can be projected on the table with two or more persons sitting across the projector 200 for discussion. When the projector 200 is placed on the table, by selecting the direction of output of the projected image 16, the projected image 16 can be seen comfortably without moving the projector 200 or having to move the participants. In this case, preferably the vertical direction of the projected image 16 can be changed depending on whether the projected image 16 is output to the left or right. When the projector 200 is installed on the table, too, an enlarged projected image can be obtained without having to move the entire projector 200.

The projecting optical path deflecting element 23 may be tilted or rotated at a desired angle, so that the incident angle of the light beam from the reflective optical element 18C can be varied, thereby controlling the projected direction of the projected image. As shown in FIG. 4B, when the projecting optical path deflecting element 23 is rotated in a clockwise direction, the projected image 16C that is formed can be also rotated in a clockwise direction.

Because the projecting optical path deflecting element 23 has no power, the imaging performance of the variable magnification optical system 100 is not adversely affected when the angle of the projecting optical path deflecting element 23 is changed. For example, in FIG. 4A, the incident angle of the projecting light on the screen 15C is θ5 when the projecting optical path deflecting element 23 is perpendicular to the screen 15C. The same projected image 16 can be formed on the screen 15C when the screen 15C is tilted toward the projector 200 as shown in FIG. 4B, by changing the angle of the projecting light so that the incident angle of the projecting light on the screen 15C is θ5. Thus, the direction of the projecting light can be changed by varying the angle of the projecting optical path deflecting element 23 alone, without tilting the projector 200 as a whole.

Referring to FIG. 4B, when the projecting optical path deflecting element 23 is rotated by η, the projected image 16C is tilted by 2η. Thus, the projected image 16C can be obtained without distortion by tilting the projecting optical path deflecting element 23 by one half the amount of tilt in the projected image 16C.

Thus, in accordance with the present embodiment, the projecting light can be bent in the projector 200, whereby the space occupied by the entire projecting system can be reduced.

Embodiment 4

In the first through third embodiments, the reflective optical element 18 and the second optical system 12 are moved to change the projection distance, and further the intervals between the individual optical elements 12a to 12e of the second optical system 12 are adjusted for focusing. In the fourth embodiment, the optical elements 11a to 11e of the first optical system 11D are moved for focusing in the projector 200.

Figure 5A:
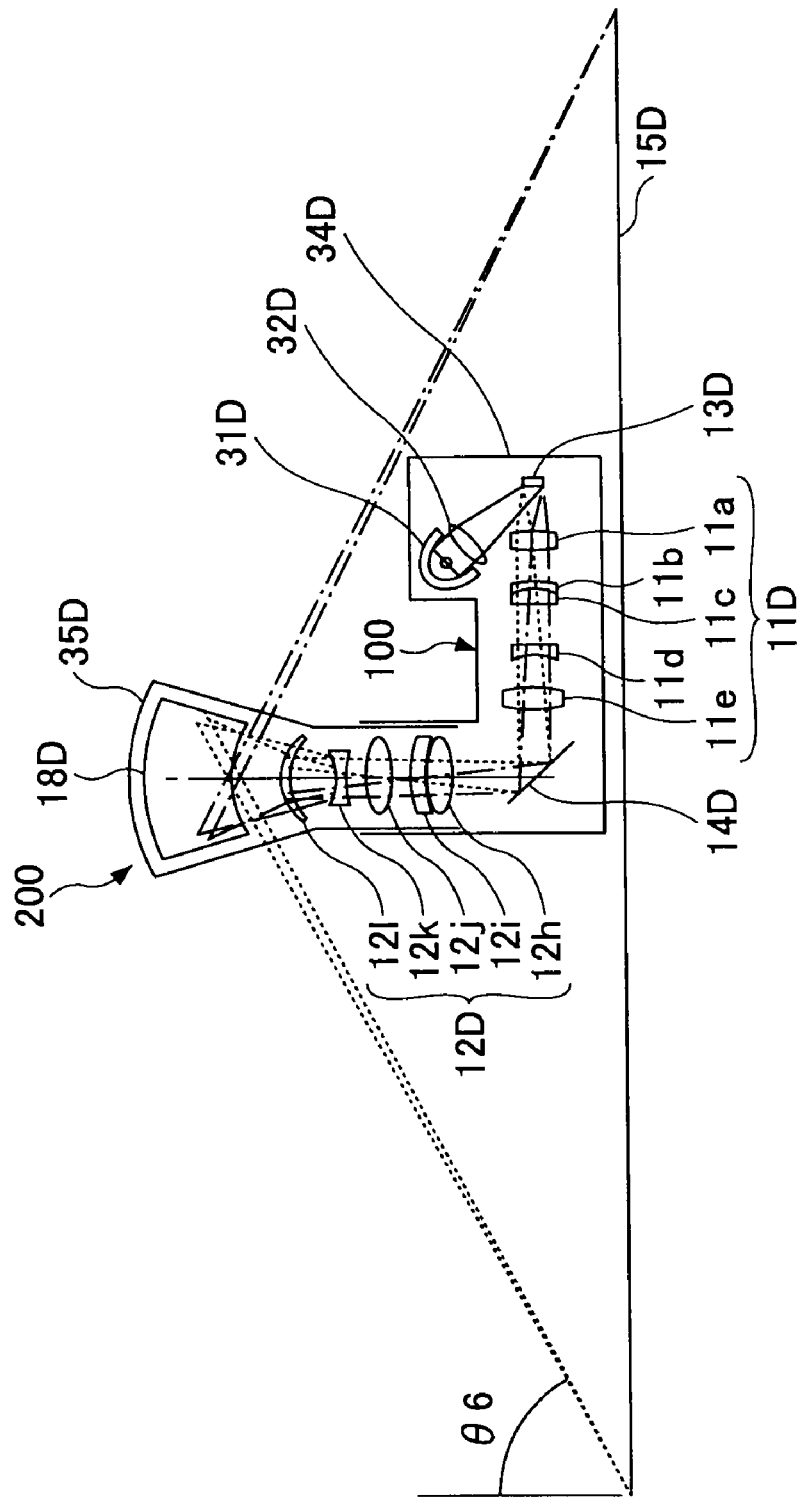
FIG. 5A shows a projector according to a fourth embodiment of the present invention, on a reduced image end.

FIGS. 5A and 5B show the projector 200 according to the fourth embodiment, corresponding to FIG. 3 as seen from above the screen 15D. As described above, the light beam emitted by the light source 31D illuminates an image generating unit 13D via an illuminating optical system 32D. The light beam, which is modulated in accordance with an image signal, passes through the first optical system 11D, the second optical system 12D, and the reflective optical element 18D and forms a projected image on the screen 15D with a desired magnification, reflecting the image information at the image generating unit 13D.

At least the light source 31D, the illuminating optical system 32D, the image generating unit 13D, and the first optical system 11D are fixed on a base unit 34D. The second optical system 12D and the reflective optical element 18D are integrally retained in a lens tube 35D. The lens tube 35D can be moved relative to the base unit 34D so that the lens tube 35D can be positioned toward or away from the screen 15D.

When the incident angle of the projecting light on the screen 15D at the reduced end of the projected image shown in FIG. 5A is θ6, and the incident angle on the enlarged end of the projected image shown in FIG. 5B is θ7, θ6≈θ7, as in the case of the first through third embodiments.

In accordance with the present embodiment, because the light source 31D, the illuminating optical system 32D, and the image generating unit 13D are fixed to the base unit 34D, their positional relationships with respect to the screen 15D do not change. However, as shown in FIG. 5B, because the lens tube 35D is movable toward and away from the screen 15D, the projection distance can be adjusted.

In order to ensure desired imaging performance by correcting various aberrations depending on the projection distance, the plural optical elements 11a to 11e of the first optical system 11D are moved along the optical axis for focusing upon image magnification. Namely, the magnification ratio is adjusted by the second optical system 12D while focusing is adjusted by the first optical system 11D.

Because the setting of the projection distance and the focusing adjustment can be made independently, the mechanical drive unit for the second optical system 12D can be simplified, thus enabling a further decrease in size of the projector 200.

Embodiment 5

In the first through third embodiments, the optical elements 12a to 12g of the second optical system 12 are moved along the optical axis. In the fifth embodiment, the reflective optical element 18E alone is moved to change the projection distance and hence magnification. For focus adjustment, either the first optical system 11E or the second optical system 12E, or both, may be moved.

Figure 6A:
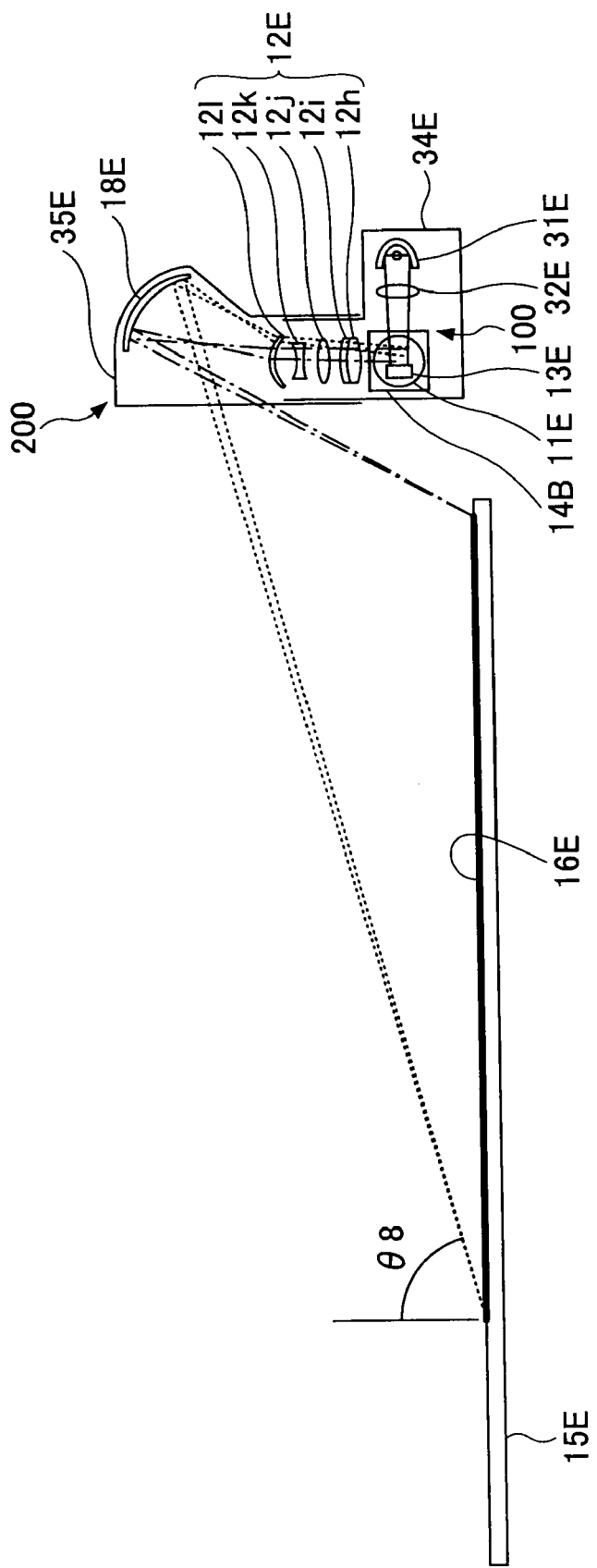
FIG. 6A shows a projector according to a fifth embodiment of the present invention, on a reduced image end.
Figure 6B:
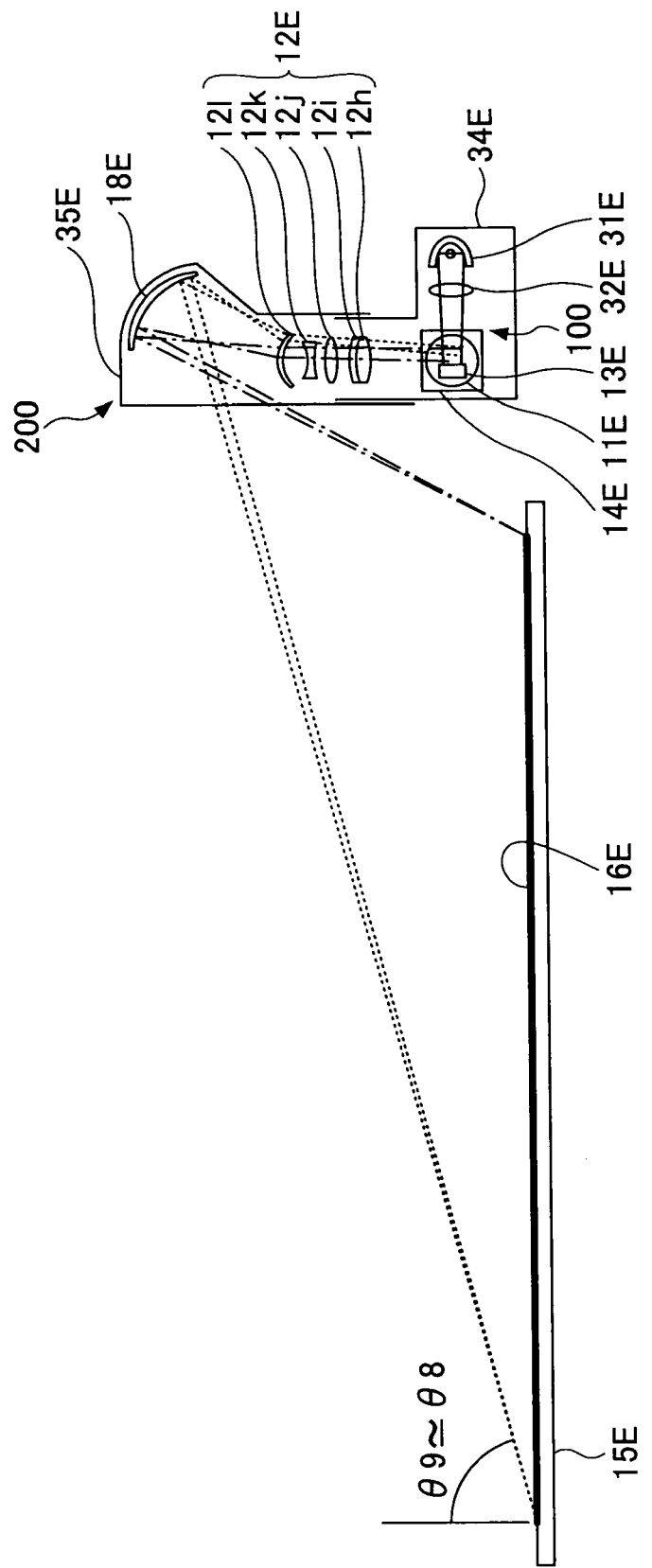
FIG. 6B shows the projector of the fifth embodiment, on an enlarged image end.

FIG. 6A shows the projector 200 in the case of a reduced projected image. FIG. 6B shows the projector 200 in the case of an enlarged projected image. It should be noted that, while the reflective optical element 18E shown in FIG. 6B is farther from the screen 11E than in FIG. 6A, none of the optical elements 12a to 12e of the second optical system 12E of FIG. 6B are moved. While not illustrated, focusing is adjusted by moving the optical elements 11a to 11g of the first optical system 11E.

As in the foregoing embodiments, the incident angle θ8 of the projecting light on the screen 15E on the reduced end of the projected image 16E as shown in FIG. 6A is substantially the same as the incident angle θ9 on the enlarged end of the projected image 16E as shown in FIG. 6B.

In accordance with the present embodiment, the projection distance is set via the reflective optical element 18E alone. Focusing is adjusted by moving either the first optical system 11E or the second optical system 12E, or both, so that an extended focusing range can be obtained. Namely, the allowable area for installment of the projector 200 can be increased.

Embodiment 6

In the first through fifth embodiments, projected magnification is changed by extending or reducing the projection distance without substantially changing the maximum angle of view between the reflective optical element 18 and the projected position. However, some of the lenses in the first optical system 11F and the second optical system 12 may be moved to change the projected angle of view and the projected magnification.

FIG. 7A shows the projector 200 on the reduced end of the projected image, while FIG. 7B shows the projector 200 on the enlarged end of the projected image. The incident angle on the screen 15F in the case of the reduced end shown in FIG. 7A is θ10, while the corresponding incident angle on the enlarged end is θ11. In accordance with the present embodiment, θ11 may be greater than θ10 so that magnification can be increased greatly without changing the projection distance greatly. Conversely, the incident angle θ10 on the reduced end may be greater than the incident angle θ11 on the enlarged end.

Thus, in addition to changing the projection distance by changing the distance between the reflective optical element 18F and the screen 15F, lenses may be moved to change the projected angle of view, whereby magnification can be increased more than by just moving the reflective optical element 18F. Further, when the same magnification is obtained, the increase in the size of the reflective optical element 18F can be prevented more than by a conventional optical system in which magnification is increased without changing the projection distance.

As described above, in accordance with the present embodiment, the size of the projected image 16E can be increased by moving the reflective optical element 18 without changing the projected angle of view, whereby the size of the reflective optical element 18F and hence the projector 200 can be reduced. Further, by providing the projecting optical path deflecting element 23, two projected images can be obtained.

By changing the projected angle of view in addition to moving the reflective optical element 18F, even higher magnification ratios can be obtained.

In the foregoing embodiments, the variable magnification optical system 100 is applied in the projector 200. In another embodiment, the variable magnification optical system may be applied in an optical system for reading information recorded on a flat surface, such as a white board, and then forming a reduced image of the information at a conjugate position to the reading position (where the direction of the light beam will be opposite). In still another embodiment, the variable magnification optical system may be applied in an image reading apparatus in which a two-dimensional sensor is disposed at a position where a reduced image is formed.

Embodiment 7

Hereafter, the variable magnification optical system 100 according to the foregoing embodiments is described with reference to specific values. While reference is made to the first embodiment in the following description, the values mentioned may be similarly applied to any of the second through sixth embodiments.

FIG. 8 shows a table of various parameters of the variable magnification optical system 100, including "Plane number", "ROC (radius of curvature) (mm)", "Plane interval (mm)", "Refractive index", "Abbe's number", "(presence/absence of) Aspheric surface", "(presence/absence of) XY polynomial free-form surface", "(presence/absence of) reflecting surface", "(presence/absence of) Eccentricity/tilt", and "(presence/absence of) Movement (of plane) by magnification change". The plane numbers are allocated to the optical elements in the optical systems in order along the direction of travel of the light beam. The plane numbers of the incidence planes of the optical elements that refract or transmit light are associated with the refractive indexes and the Abbe's numbers.

The plane number is allocated to each of an incidence plane and an exit plane in the case of a lens, while a single plane number is given to a mirror or an aperture. The plane number 1 (CG) indicates an incidence plane of a cover glass. The plane number 3 (P: prism) indicates an incidence plane of a transmitting optical element. The plane numbers 5, 7, 8, 10, and 12 indicate the incidence planes of the lenses L1 to L5 of the first optical system 11. The plane numbers 15, 17, 19, 21, 23, and 25 indicate the incidence planes of the lenses L6 to L11 of the second optical system 12. The plane number 27 (M1) indicates a reflecting surface of the reflective optical element 18.

In FIG. 8, the plane numbers 19 and 20 to which circles are allocated in the column for aspheric surface are rotationally symmetric aspheric surfaces. The plane number 27 with a circle in the column for polynomial free-form surface is an anamorphic polynomial free-form surface.

FIG. 9 shows a table of aspheric surface coefficients of the plane number 19. FIG. 10 shows a table of aspheric surface coefficients of the plane number 20. FIG. 11 shows a table of polynomial free-form surface coefficients of the plane number 27. As well known, a rotationally symmetric aspheric surface is expressed by an aspheric surface expression as follows:

$$Z=c \cdot r^2/[1+\sqrt{\{1-(1+k)c^2r^2\}}]+Ar^4+Br^6+Cr^8$$

where Z is a depth in the optical axis direction; c is a paraxial radius of curvature; r is a distance from the optical axis in a direction perpendicular to the optical axis; k is a conic coefficient; and A, B, C, . . . and so on are aspheric surface coefficients of higher orders. By allocating values to k, A, B, C . . . according to FIGS. 9 and 10, the shape of the optical elements with the plane numbers 19 and 20 can be identified. The orders corresponding to the coefficients A, B, C, . . . and so on are shown in FIG. 12.

The shape of an optical element with an anamorphic polynomial free-form surface, such as the plane number 27, with respect to a projected image is expressed by:

$$Z=X2 \cdot x2+Y2 \cdot y2+X2Y \cdot x2y+Y3 \cdot y3+X4 \cdot x4+X2Y2 \cdot x2y2+\\Y4 \cdot y4+X4Y \cdot x4y+X2Y3 \cdot x2y3+Y5 \cdot y5+X6 \cdot x6+\\X4Y2 \cdot x4y2+X2Y4 \cdot x2y4+Y6 \cdot y6+\ldots$$

where Y is the minor axis direction; X is the major axis direction; Z is the depth of a curved surface; and "X2, Y2, X2Y, Y3, X2Y2, . . . " are coefficients.

The plane number 27 in FIG. 8 is given a circle in the column for reflecting surface, indicating that the plane number 27 is a mirror. Those planes with an eccentricity or tilt with respect to the reference axis of the optical system, i.e., the optical axis of the first optical system 11, are given a circle in their column for "Eccentricity/tilt" in FIG. B.

FIG. 13 shows an example of data concerning the eccentricity or tilt in the plane number 5. FIG. 14 shows an example of data concerning the eccentricity or tilt in the plane number 27. These data indicate that the plane number 5 is shifted in the Y direction by −2.08 mm and is not tilted in the YZ plane (i.e., rotation angle is zero). The plane number 27 is shifted in the Y direction by −67.15 mm and tilted in the YZ plane by −46.6°.

Values of the plane intervals as shown in FIG. 8, which change depending on the projected size (screen size), may be registered in a control unit (not shown). The plane interval indicates a distance in millimeters of a particular plane from the plane immediately before. The variable magnification optical system 100 may be able to change projected size from 25 inches to 35 inches with a projected magnification of 1.4. Because the magnification of an image can be changed, the planes that are moved are indicated in the column for "Movement by magnification change" in FIG. 8. Thus, in FIG. 8, the plane interval of those planes given the circle in the column for "Movement by magnification change" varies. For example, because the plane numbers 14, 18, 20, 24, 26, and 27 are given the circle, the plane interval between the plane number 14, which is an aperture with a fixed position, and L6 (L6 and L7 being integral) varies. The plane intervals shown in FIG. 8 indicate the plane intervals when the projected size is 35 inches.

FIG. 15 shows the plane intervals between the plane numbers 14, 18, 20, 24, 26, and 27 and the plane numbers 15, 19, 21, 25, 27, and 28, respectively, in various projected sizes at a projected magnification of 1.4. For example, in the case of the plane number 14, the plane interval from the plane number 15 changes from 1.00 to 7.69 as the projected size is changed from 25 inches to 35 inches. Thus, when the projected magnification is 1.4, although the plane intervals between the plane numbers 14, 18, 20, 24, 26, and 27 and the plane numbers 15, 19, 21, 25, 27, and 28, respectively, greatly change, the incident angle of the light beam on the projected plane, for example, hardly changes.

Figure 16A:
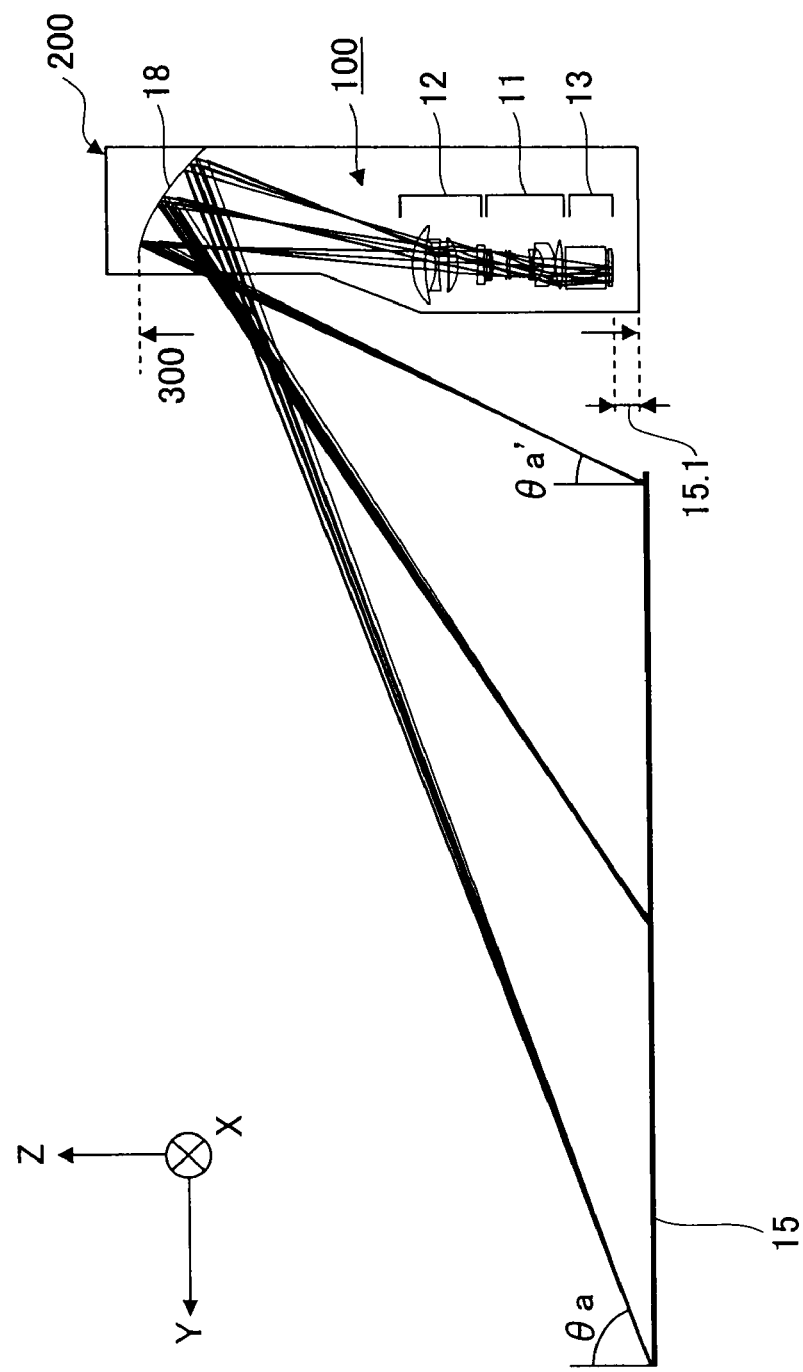
Figure 16C:
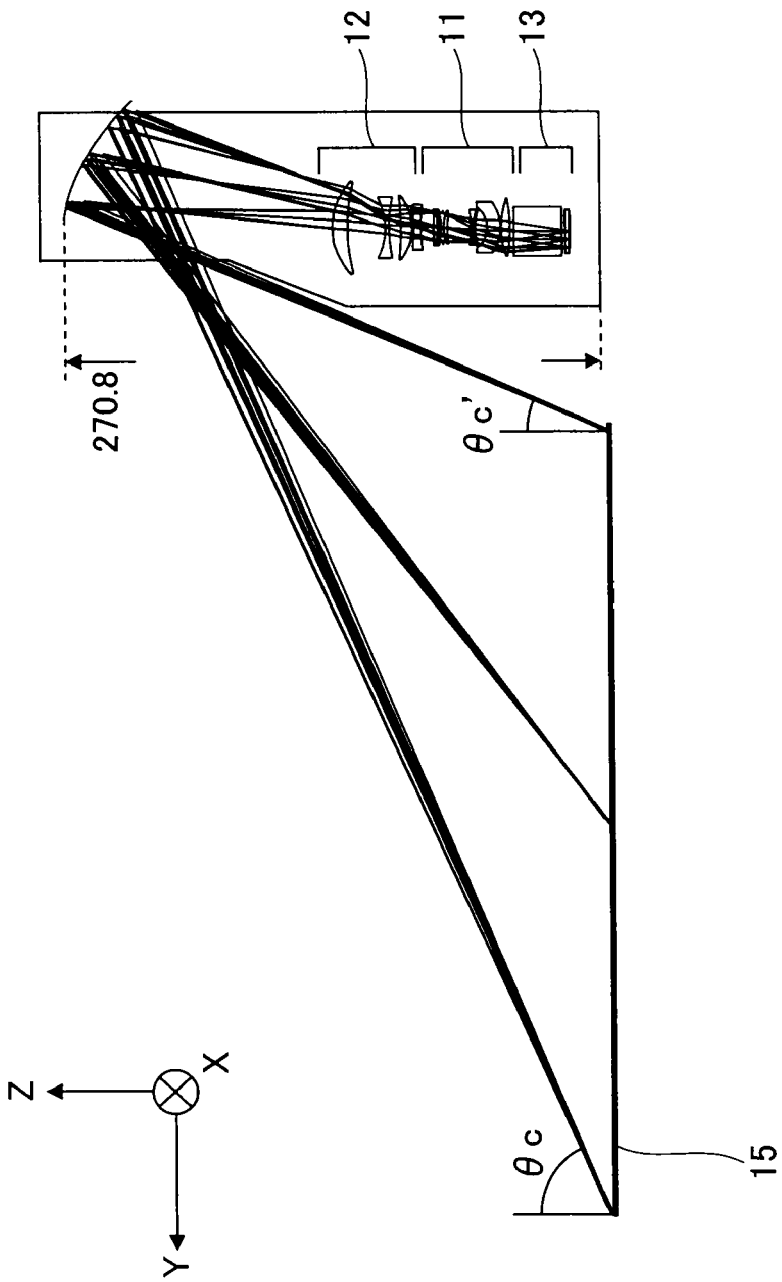

In the following, a case where the projected size is changed from 35 inches to 25 inches is described in detail. FIGS. 16A to 16C show the optical paths when the projected size is 35 inches, 30 inches, and 25 inches, respectively. As shown, the light beam emitted from the image forming unit 13 is focused on the screen 15. When the magnification ratio is changed, while the positional relationship between the screen 15 and the image forming unit 13 does not change, the lenses in the second optical system 12 are moved along the optical axis simultaneously as the reflective optical element 18 is moved (vertically in the drawing). Further, the image plane of the projector 200 remains over the screen 15 even when magnification is changed.

The greatest distance between the screen 15 and the reflective optical element 18 in the Z direction is 300.0 mm, 285.6 mm, and 270.8 mm when the projected size is 35 inches, 30 inches, and 25 inches, respectively. The distance between the screen 15 and the image forming unit 13 in the Z direction remains the same at 15.1 mm regardless of the projected size. Because the distance between the screen 15 and the image forming unit 13 is not changed by a change in the projected size, there is no need to adjust an illuminating unit (not shown) for illuminating the image forming unit 13 or an electric circuit unit (not shown) for electrically changing the image on the image forming unit 13, thus simplifying the structure of the system.

FIG. 17 shows a list of values of the maximum incident angles θa, θb, and θc and the minimum incident angles θa', θb', and θc' on the screen 15 shown in FIG. 16 at different projected sizes. On an arbitrary cross section including the optical axis of the refractive optical system, a light beam with the maximum incident angle to the screen 15 and a light beam with the minimum incident angle to the screen 15 are uniquely determined. The incident angles are described with respect to a cross section defined on the YZ plane.

In accordance with the present embodiment, as shown in FIG. 17, when the projected size changes from 35 inches to 25 inches (corresponding to a 1.4 times change in projected size), the maximum incident angle changes only about 3.4°, with a change of 2.8° in the minimum incident angle.

The difference between the minimum incident angle and the maximum incident angle at each projected size is 43.8° at 35 inches; 43.5° at 30 inches; and 43.2° at 25 inches. Thus, while the projected size changes at least by 1.4 times, the difference between the minimum and maximum incident angles changes by only 0.6°.

Thus, in the variable magnification optical system 100 according to the present embodiment, the projected size can be increased from 25 inches to 35 inches with very little change in the maximum and minimum incident angles and very little change in the difference between the minimum and maximum incident angles, resulting in a zoom ratio of as much as 1.4. Because the change in the incident angles is so small, the position of the light shone on the reflective optical element 18 does not change, so that the increase in size of the variable magnification optical system 100 can be prevented.

Figure 18:
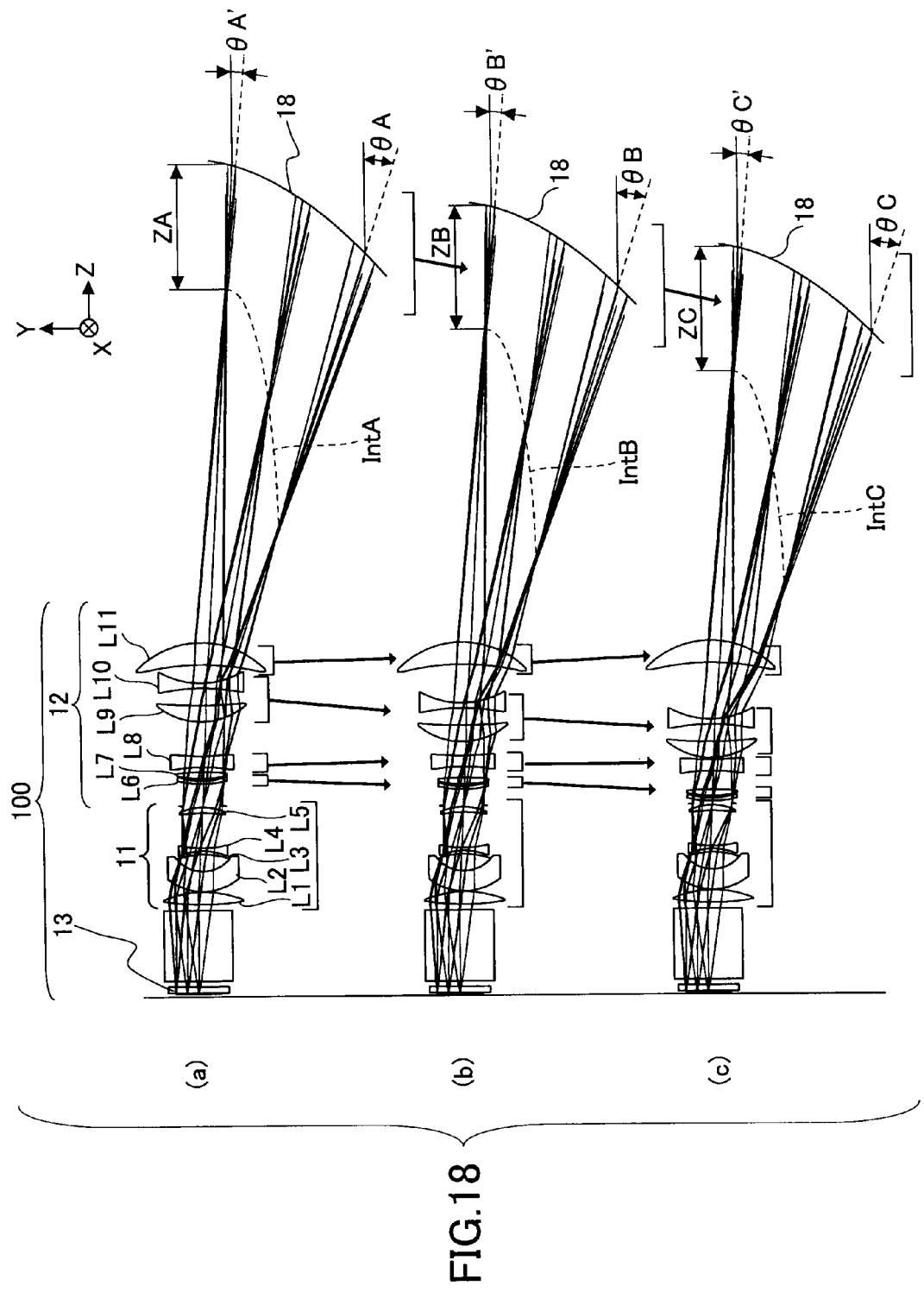
FIG. 18(a) to 18(c) shows the movements of a reflective optical element, a first optical system, and a second optical system at different projected sizes.

FIG. 18(*a*) to (*c*) shows enlarged views of FIGS. 16A to 16C between the image forming unit 13 and the reflective optical element, illustrating the movements of the reflective optical element 18, the first optical system 11, and the second optical system 12 when the size of the projected image is changed from 35 inches to 25 inches. In FIG. 18, four groups of lenses in the second optical system 12 (which are different from those of the first through sixth embodiments), i.e., L6-L7, L8, L9-L10, and L11, and the reflective optical element are moved in the Z direction so that the projected size on the screen 15 can be changed. In the present embodiment, the movements of the optical elements for a magnification change are along the optical axis alone. In another embodiment, the movements may be along an axis other than the optical axis. For example, the reflective optical element may be moved diagonally with respect to the optical axis.

Referring to FIG. 18, IntA, IntB, and IntC (broken lines) each indicate an intermediate image 19. As mentioned above, the refractive optical system, including the first optical system 11 and the second optical system 12, forms the intermediate image IntA-C before the reflective optical element 18 (concave mirror). The position of the intermediate image IntA-C on the optical axis with respect to the upper edge of the reflective optical element 18 farthest from the second optical system 12 is at a distance ZA ((a) at 35 inches), ZB ((b) at 30 inches), and ZC ((c) at 35 inches).

At any of the projected sizes, in the intermediate image IntA-C, a higher image position is formed nearer the refractive optical system, and a lower image position is formed nearer the reflective optical element 18. The intermediate image IntA-C is curved more than, and in the same direction as, the reflective optical element 18.

While the projected size changes at least by 1.4 times, the size of the intermediate image IntA-C at each projected size hardly changes. Namely, the projected magnification of the intermediate image IntA-C as seen from the optical system hardly changes. The positional relationship (distance) between the intermediate image IntA-C and the reflective optical element 18 remains substantially constant. Specifically, the individual optical elements in the second optical system 12 are moved so that the position of focus of the intermediate image IntA-C is maintained near the position where the light from the screen 15 is focused regardless of the position of the reflective optical element 18.

Specifically, as shown in FIG. 18, when the projected size changes by 1.4 times, the distance ZA, ZB, or ZC between one end of the intermediate image IntA-C and the intermediate optical element 18 remains substantially the same, regardless of the movement of the intermediate optical element 18. Namely, regarding the position of the intermediate image IntA-C, as the reflective optical element 18 (concave mirror) moves toward the object plane, i.e., toward the image forming unit 13, the intermediate image IntA-C also moves toward the object plane (optical system side) while maintaining its relative position to the reflective optical element 18. In order to move the intermediate image IntA-C, which is formed by the refractive optical system, the positional relationship of the lenses of the second optical system 12 forming the refractive optical system are changed as shown in FIG. 18(*a*) to (*c*).

When the magnification of the projected size is changed from 25 inches to 35 inches, at least one of the optical elements in the second optical system is moved as the reflective optical element 18 is moved away from the image forming apparatus 13 so that the intermediate image IntA-C can be moved away from the image forming apparatus 13 while the projected magnification is maintained. In this way, the relative position of the intermediate image IntA-C to the reflective optical element 18 is maintained. Namely, as the reflective optical element 18 is moved away from the image forming apparatus 13, at least one of the optical elements in the second optical system is moved so that the intermediate image IntA-C, while maintaining its projected magnification, can be formed near the position where the light from the screen 15 is imaged.

FIG. 19 shows a table of values of the maximum angles θA, θB, and θC and the minimum angles θA', θB', and θC' of the projecting light in the YZ plane when the projected size is 35 inches, 30 inches, and 25 inches, respectively. The difference between the maximum angles of the projecting light due to the magnification change is 0.71°, while the difference in the minimum angles is 0.24°, indicating that the projecting light angles are substantially constant. Further, the difference between the maximum angle and the minimum angle of the projecting light at each projected size changes very little, by 0.47°.

Because the positional relationship (distance) between the intermediate image IntA-C and the reflective optical element 18 is substantially constant and the size of the intermediate image IntA-C (magnification ratio) does not change, the angle of the light reflected by the reflective optical element 18 onto the screen 15 remains substantially constant regardless of the projected size. Thus, the projected size of the projected enlarged image is determined by the positional relationship between the reflective optical element 18 and the screen 15. Further, the need to provide a leeway in the size of the reflective optical element 18 can be eliminated.

Figure 20:
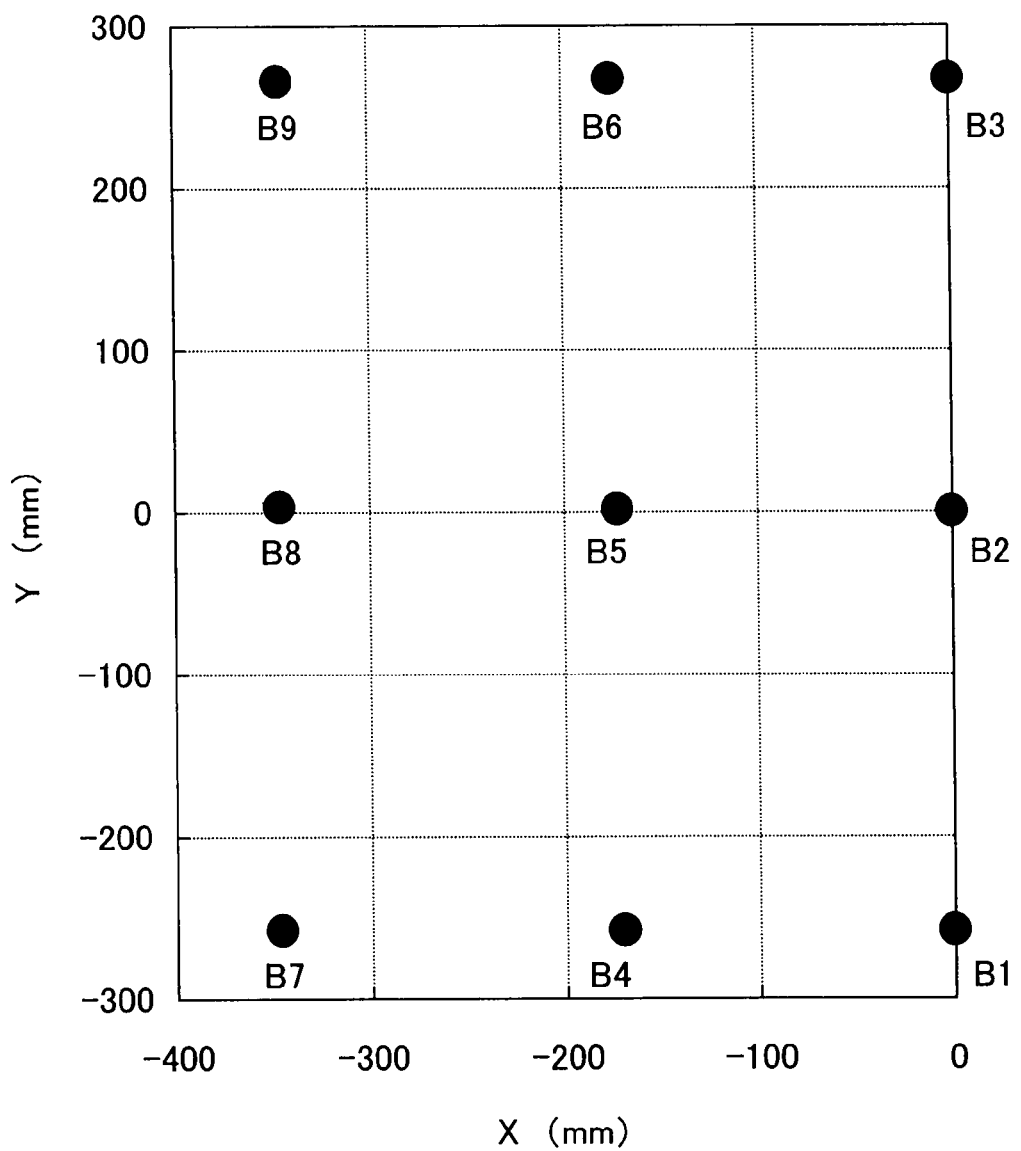
FIG. 20 shows a plot of positions of object points on an image plane when the projected size is 35 inches.
Figure 21:
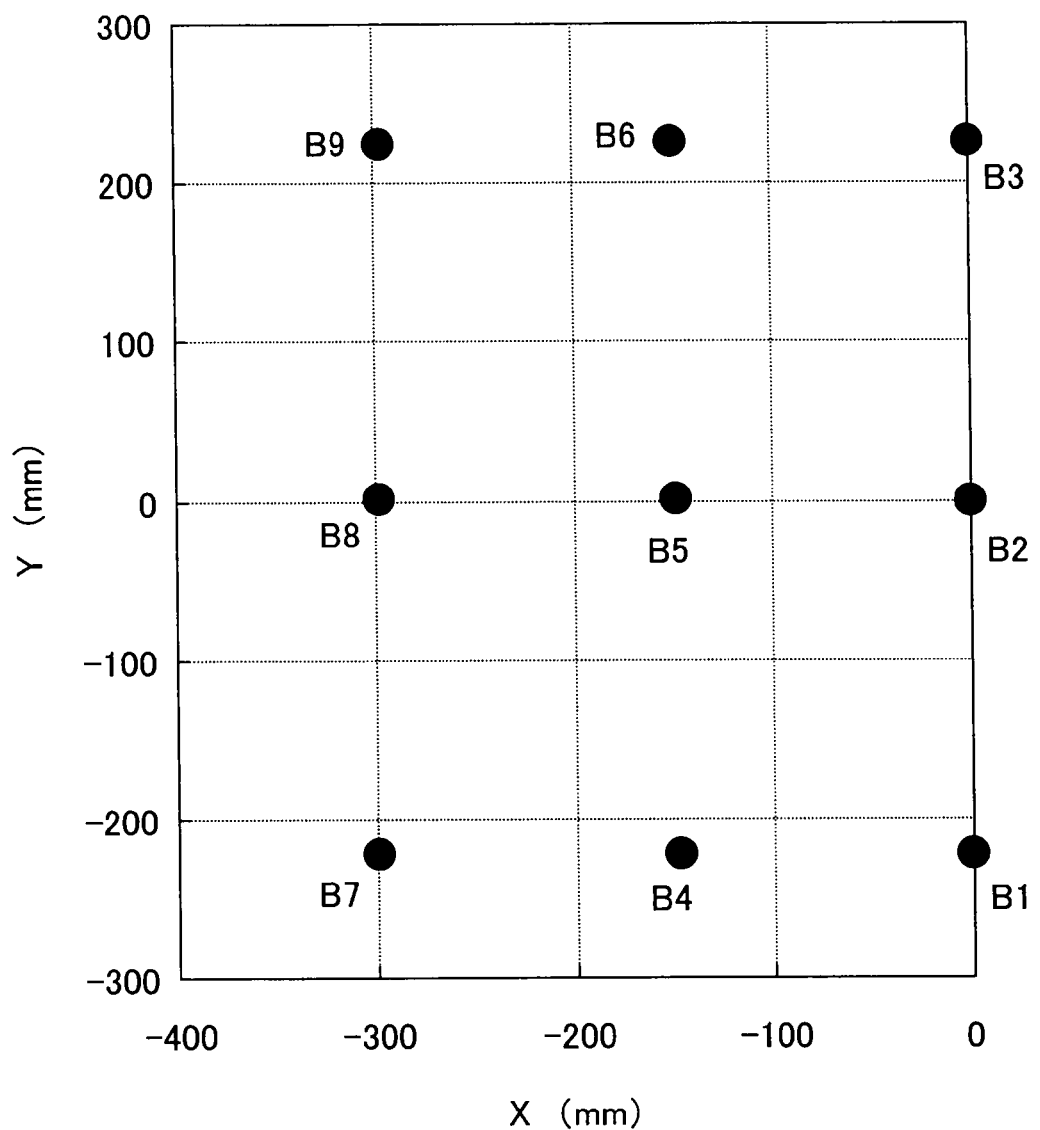
FIG. 21 shows a plot of positions of object points on an image plane when the projected size is 30 inches.
Figure 22:
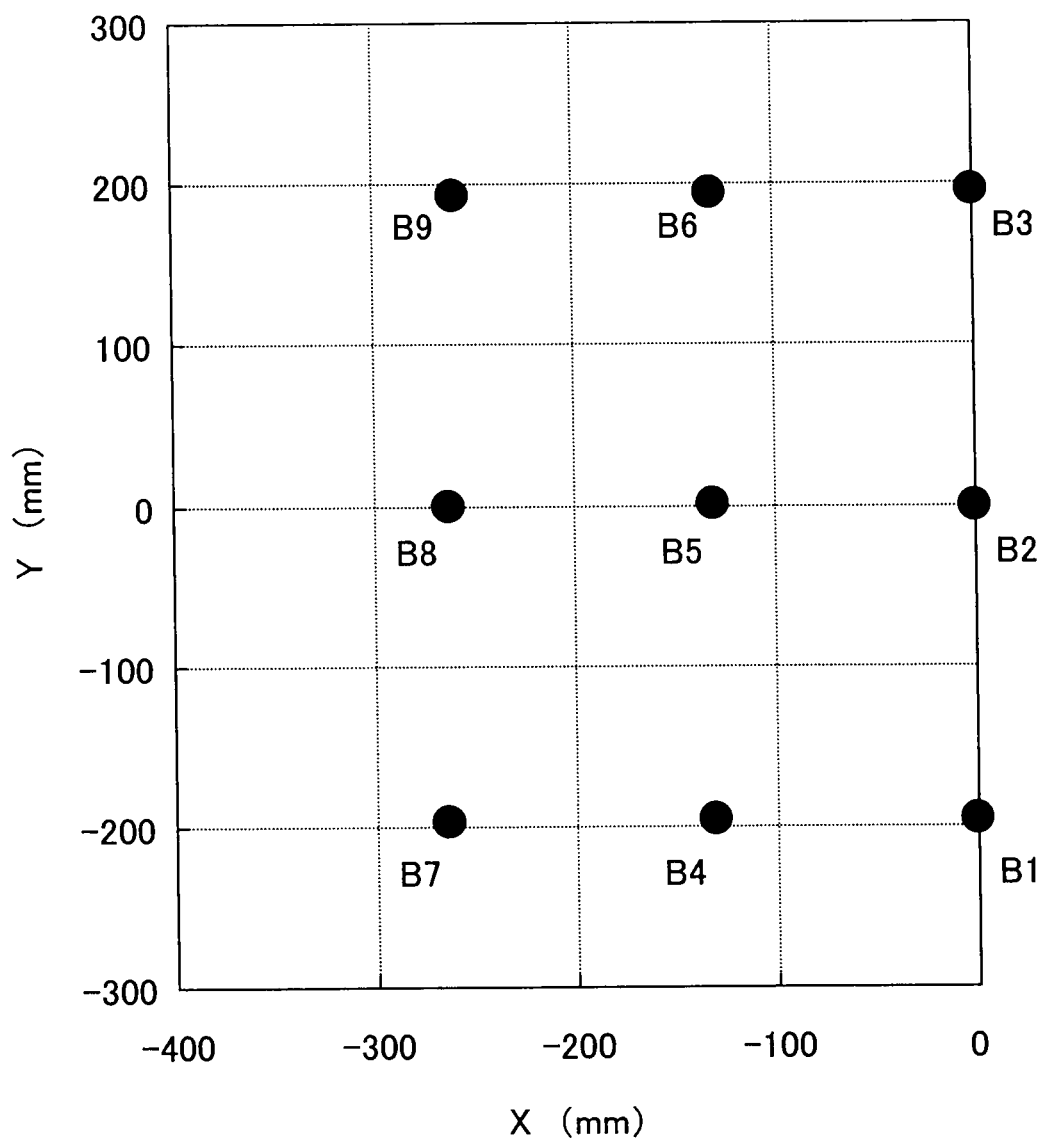
FIG. 22 shows a plot of positions of object points on an image plane when the projected size is 25 inches.
Figure 23:
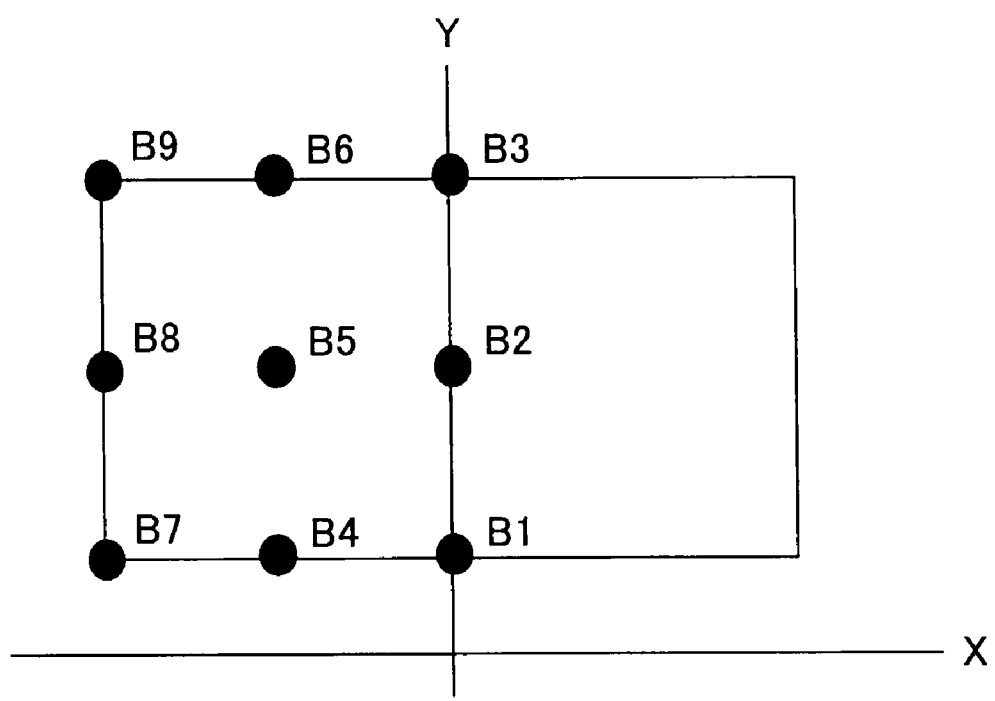
FIG. 23 shows the coordinates of individual object points in an image generating unit.

Distortion of the screen is described in detail. FIGS. 20 to 22 show examples of object points on the image plane (screen 15). FIG. 23 shows coordinates of each of the object points on the image generating unit 13. In FIG. 23, in the image plane on the XY plane, an area such that X≦0 is divided into three equal parts in the X direction and the Y direction, obtaining nine lattice points B1 to B9.

FIG. 20 shows the position of each of the object points when the projected size is 35 inches. FIG. 21 shows the position of each object point when the projected size is 30 inches. FIG. 22 shows the position of each object point when the projected size is 25 inches. FIGS. 20 through 22 show B1 to B3 positioned on the axis X=0, while B2, B5, and B8 are positioned on the axis Y=0, indicating that distortion on the screen is sufficiently controlled.

Figure 24:
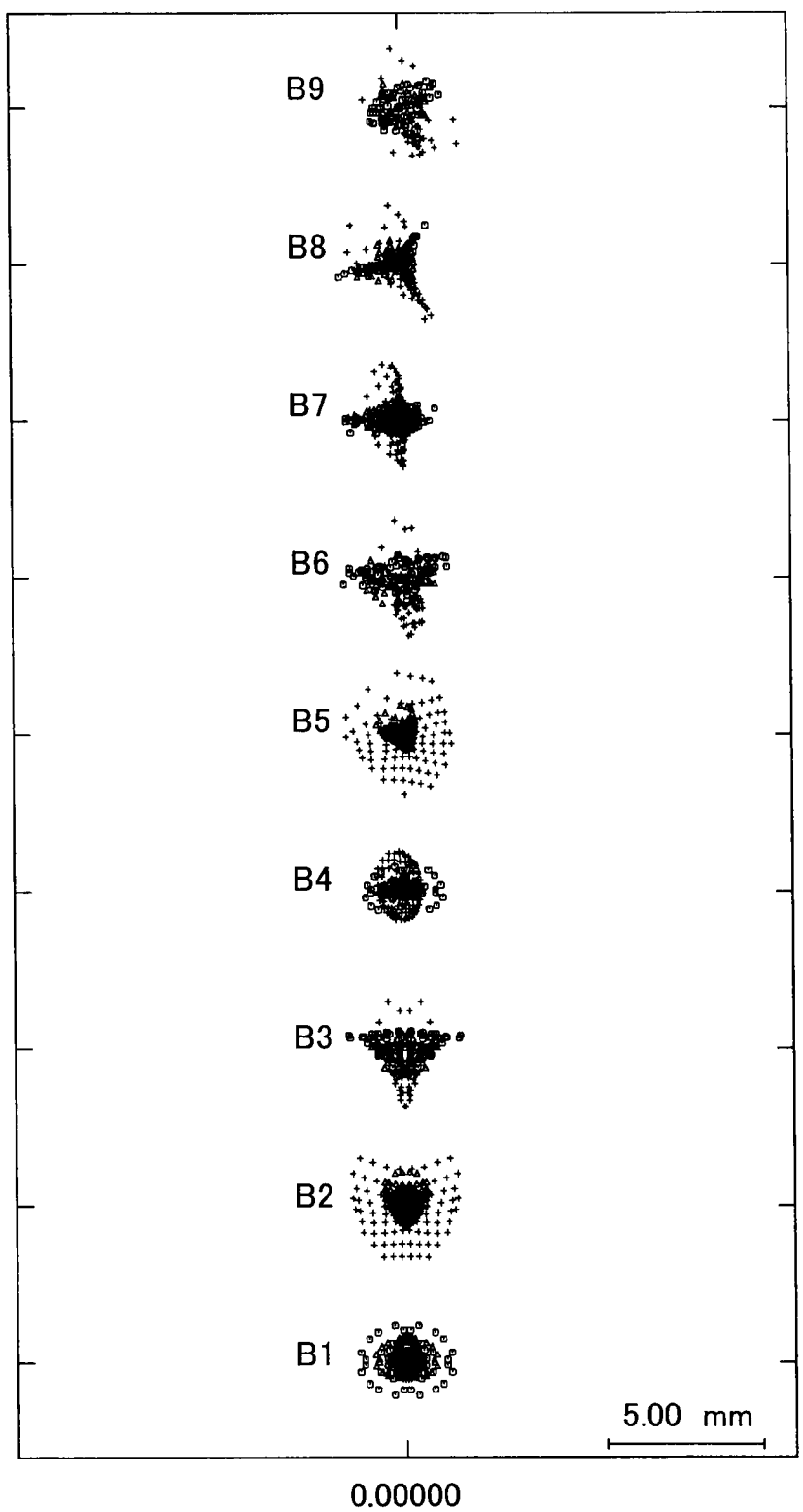
FIG. 24 shows a spot diagram when the projected size is 35 inches.
Figure 25:
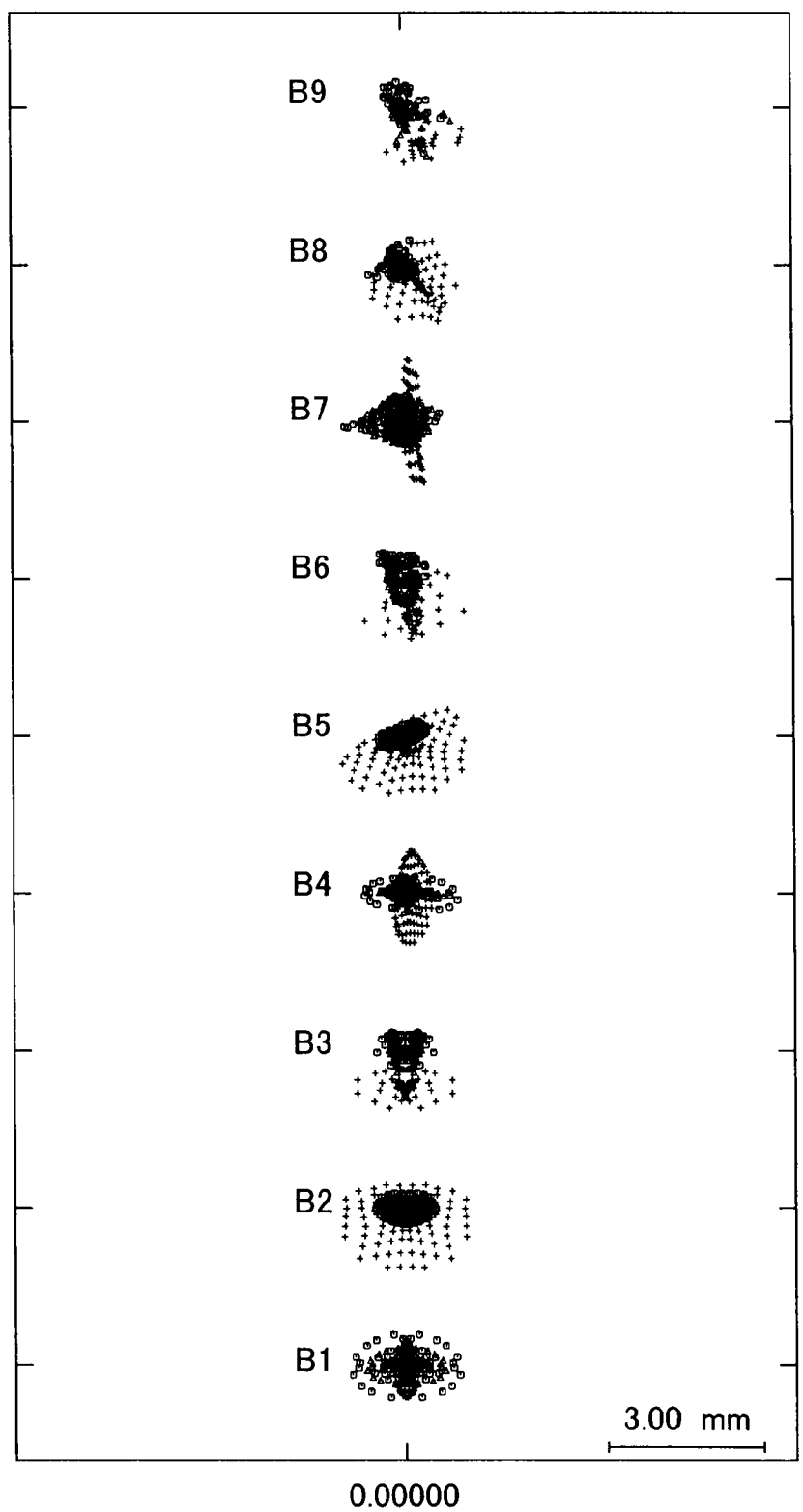
FIG. 25 shows a spot diagram when the projected size is 30 inches.
Figure 26:
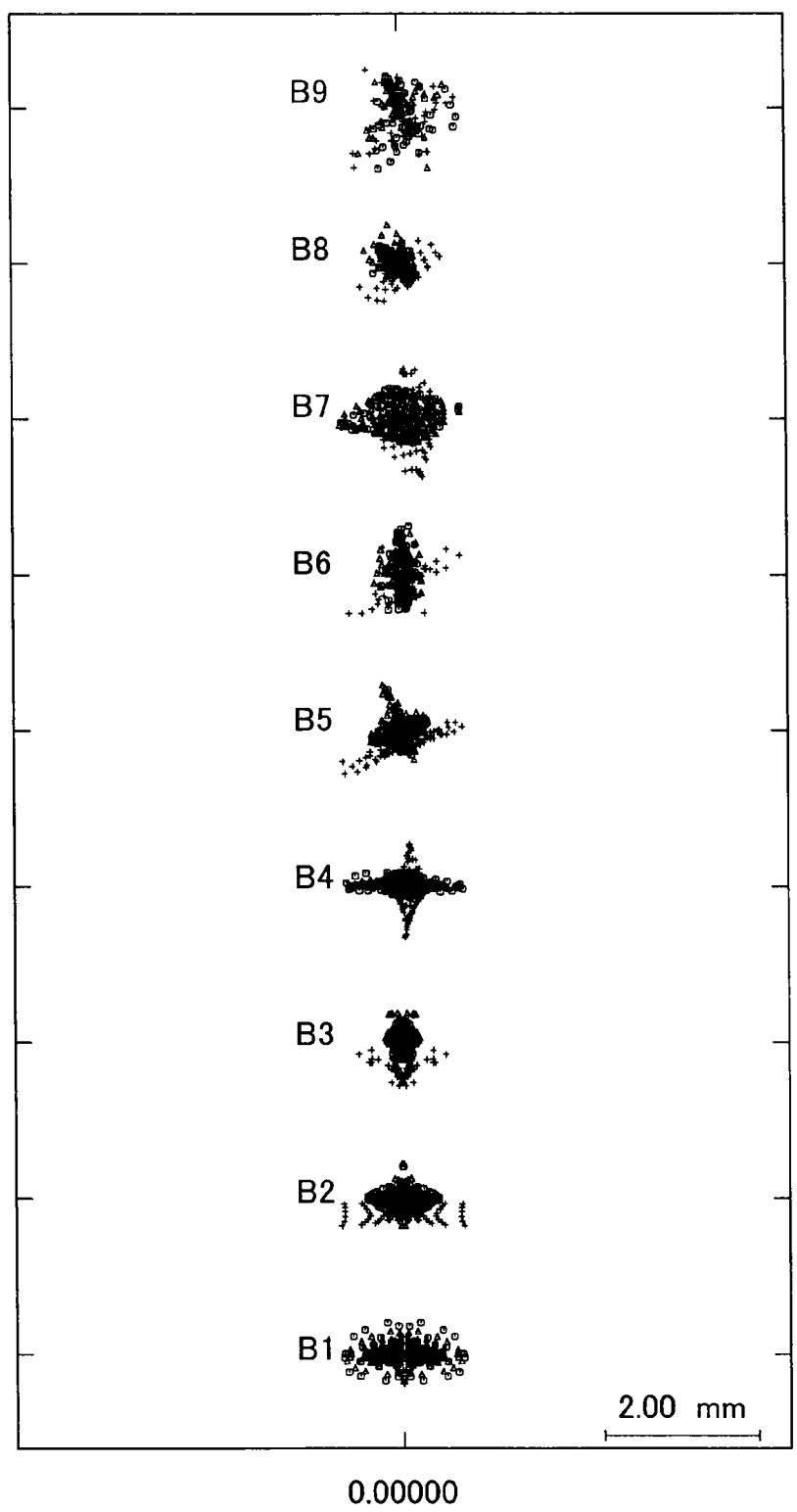
FIG. 26 shows a spot diagram when the projected size is 25 inches.

FIGS. 24 to 26 shows spot diagrams (plots of spots imaged on the focal plane from a single object point through a lens) when the projected size is 35 inches, 30 inches, and 25 inches, respectively. The numbers allocated to the individual spots correspond to the numbers of the aforementioned lattice points. It can be seen from FIGS. 24 to 26 that the spots formed are sufficiently small, indicating the formation of an image with high resolution on the screen.

Referring to FIGS. 24 to 26, the maximum angle (at the upper edge of the projected screen, which is position B9 in FIG. 20) of the main light ray incident on the beam screen 15 is 72.0°, 70.3°, and 69° when the projected size is 35 inches, 30 inches, and 25 inches, respectively. The difference in the maximum angle is thus 3° at the most. As mentioned above, the incident angle remains substantially constant when the projected magnification changes. In consideration of the change in peripheral brightness due to a change in projected magnification, the difference in the maximum angle is preferably about 5° or less, within which it is known that a change in light amount can be controlled. Thus, FIG. 24 indicates satisfactory results obtained by the variable magnification optical system 100 according to the present embodiment.

Although the smaller the difference between the maximum and minimum incident angles, the better, it is generally supposed that sufficient image quality can be obtained when the difference is less than 1° preferably, or no more than 3° at the most. As shown in FIG. 17, in the variable magnification optical system 100 of the present embodiment, the difference between the maximum and minimum incident angles is less than 1°. Thus, the variable magnification optical system 100 can enable the projection of an enlarged image at a sufficient magnification without increasing the size of the mirror.

In the present embodiment, the distance between the farthest edge of the reflective optical element 18 from the screen 15 along the Z axis is 300.0 mm, 285.6 mm, and 270.8 mm when the projected size is 35 inches, 30 inches, and 25 inches, respectively. Thus, with a change of about 29.2 mm in the position of the reflective optical element 18, the projected size can be changed by 1.4 times. This embodiment is based on a design adapted to a relatively small projected size, such as a desktop, as the screen 15 for projecting an image. Specific projected size, amount of magnification change, etc., may be appropriately set depending on the required specifications.

For example, in the case of a conventional projector for projecting onto a vertical screen surface or a wall surface, the projector needs to be adapted to screen sizes on the order of 40 inches to 100 inches. In this case, a required screen size ratio would be 2.5. It goes without saying that the aforementioned screen sizes can be realized by setting the amount of movement of the reflective optical element 18 greater than 29.2 mm when the angle of view is constant. In this case, the variable magnification optical system 100 may require a larger projecting system or an increased number of lenses for optimization purposes in order to satisfy the required design specifications. Thus, none of the foregoing embodiments should be taken as limiting the screen size, magnification ratio, etc., of the variable magnification optical system 100.

Although this invention has been described in detail with reference to certain embodiments, variations and modifications exist within the scope and spirit of the invention as described and defined in the following claims.

The present application is based on the Japanese Priority Applications No. 2008-225269 filed Sep. 2, 2008 and No. 2009-152735 filed Jun. 26, 2009, the entire contents of which are hereby incorporated by reference.

What is claimed is:

1. A variable magnification optical system comprising: a reflective optical element having a positive magnification power and configured to be movable relative to an object plane; and a refractive optical system configured to form an intermediate image between the object plane and the reflective optical element, the refractive optical system including plural refractive optical elements, wherein a substantially constant magnification of the intermediate image to the object plane is maintained before and after the magnification change applied to an image projected onto a screen by moving at least one of the plural refractive optical elements: increasing a distance between the screen and the reflective optical element increases a magnification applied to the image projected onto the screen, and a change in distance between the screen and the reflective optical element, to effect a change in magnification applied to an image projected onto the screen, is substantially the same as a corresponding change in distance between the reflective optical element and the object plane.

2. The variable magnification optical system according to claim 1, wherein a substantially constant relative position of the intermediate image to the reflective optical element is maintained by moving at least one of the plural refractive optical elements.

3. The variable magnification optical system according to claim 1, wherein, when the reflective optical element is moved, an incident angle of a light beam reflected by the reflective optical element on a projected plane is maintained substantially constant.

4. The variable magnification optical system according to claim 1, wherein, when the reflective optical element is moved, a difference between a maximum angle and a minimum angle of a light beam that passes through the refractive optical system, forming projecting light, with respect to an arbitrary plane is maintained at a substantially constant value.

5. The variable magnification optical system according to claim 1, wherein, when the reflective optical element is moved, an incident angle of a light beam reflected by the reflective optical element that is incident on a projected plane at a maximum angle changes by 5° or less.

6. The variable magnification optical system according to claim 1, wherein, when the reflective optical element is moved, an incident angle of a light beam reflected by the reflective optical element that is incident on a projected plane at a minimum angle changes by 5° or less.

7. The variable magnification optical system according to claim 1, wherein, when the reflective optical element is moved, a difference between a maximum angle and a minimum angle of a light beam that passes through the refractive optical system, forming projecting light, with respect to an arbitrary plane varies by 3° or less.

8. The variable magnification optical system according to claim 1, wherein
the plural refractive optical elements includes a first refractive optical element disposed upstream of the reflective optical element in a direction of travel of a light beam irradiated from the object plane along an optical axis,
the first refractive optical element is convex-concave, and
a distance between the first refractive optical element and the reflective optical element increases in response to increasing magnification of the image projected onto the screen.

9. The variable magnification optical system according to claim 8, wherein
the plural refractive optical elements includes:
a second refractive optical element disposed upstream of the first refractive optical element in a direction of travel of the light beam along the optical axis; and
a third refractive optical element disposed upstream of the second refractive optical element in a direction of travel of the light beam along the optical axis,
a distance between the second refractive optical element and the third refractive optical element remains constant in response to changes in magnification of the image projected onto the screen, and
a distance between the second refractive optical element and the first refractive optical element decreases in response to increasing magnification of the image projected onto the screen.

10. The variable magnification optical system according to claim 9, wherein
the second refractive optical element is biconcave, and
the third refractive optical element is convex-concave.

11. The variable magnification optical system according to claim 9, wherein
the plural refractive optical elements includes a fourth refractive optical element disposed upstream of the third refractive optical element in a direction of travel of the light beam along the optical axis, and
a distance between the fourth refractive optical element and the third refractive optical element increases in response to increasing magnification of the image projected onto the screen.

12. The variable magnification optical system according to claim 11, wherein the fourth refractive optical element is biconcave.

13. The variable magnification optical system according to claim 11, wherein
the plural refractive optical elements includes:
a fifth refractive optical element disposed upstream of the fourth refractive optical element in a direction of travel of the light beam along the optical axis; and
a sixth refractive optical element disposed upstream of the fifth refractive optical element in a direction of travel of the light beam along the optical axis,
a distance between the fifth refractive optical element and the sixth refractive optical element remains constant in response to changes in magnification of the image projected onto the screen, and a distance between the fifth refractive optical element and the fourth refractive optical element decreases in response to increasing magnification of the image projected onto the screen.

14. The variable magnification optical system according to claim 13, wherein
the fifth refractive optical element is biconvex, and
the sixth refractive optical element is convex-concave.

15. The variable magnification optical system according to claim 13, further comprising:
an aperture disposed upstream of the sixth refractive optical element in a direction of travel of the light beam along the optical axis,
wherein a distance between the aperture and the sixth refractive optical element increases in response to increasing magnification of the image projected onto the screen.

16. A variable magnification optical system for projecting an image onto a screen, the system comprising:
a first optical system through which a light beam irradiated from an object plane is passed;
a second optical system disposed downstream of the first optical system in a direction of travel of the light beam along an optical axis; and
a reflective optical element having a magnification power that is configured to reflect the light beam from the second optical system toward the screen, wherein
a magnification of the image projected on the screen is changed by moving the reflective optical element relative to the object plane, thus changing a distance between the screen and the reflective optical element, while an incident angle of the light beam on the screen is maintained substantially constant, and
a change in distance between the screen and the reflective optical element, to effect a change in magnification applied to an image projected onto the screen, is substantially the same as a corresponding change in distance between the reflective optical element and the object plane.

17. The variable magnification optical system according to claim 16, wherein
at least one of the first optical system and the second optical system includes plural refractive optical elements, and
one or more of the plural refractive optical elements is moved along the optical axis for focusing the image, depending on an amount of movement of the reflective optical element.

18. The variable magnification optical system according to claim 16, further comprising:
a lens tube member configured to retain the second optical system and the reflective optical element,
wherein the lens tube member is moved along the optical axis in order to change the distance between the screen and the reflective optical element.

19. A variable magnification optical apparatus comprising:
a light source;
an image generation unit that receives light from the light source;
a reflective optical element having a positive magnification power and configured to be movable relative to an object plane of the image generation unit; and
a refractive optical system configured to form an intermediate image between the object plane and the reflective optical element, the refractive optical system including plural refractive optical elements, wherein a movement of the reflective optical element effects a magnification change applied to an image projected onto a screen, a substantially constant magnification of the intermediate image to the object plane is maintained before and after the magnification change applied to the image projected onto the screen by moving at least one of the plural refractive optical elements, and when magnifying the image projected onto the screen, the distance between the screen and the reflective optical element is enlarged without changing the distance between the screen and the object plane.

20. A variable magnification optical apparatus for projecting an image onto a screen, the apparatus comprising:

a light source;

an image generation unit that receives light from the light source;

a first optical system through which a light beam irradiated from an object plane of the image generation unit is passed;

a second optical system disposed downstream of the first optical system in a direction of travel of the light beam along an optical axis; and a reflective optical element having a magnification power that is configured to reflect the light beam from the second optical system toward the screen, wherein a magnification of the image projected on the screen is changed by moving the reflective optical element relative to the object plane, thus changing a distance between the screen and the reflective optical element, while an incident angle of the light beam on the screen is maintained substantially constant, and when magnifying the image projected onto the screen, the distance between the screen and the reflective optical element is enlarged without changing the distance between the screen and the object plane.

\* \* \* \* \*